(12) United States Patent
Stumpe

(10) Patent No.: US 11,010,610 B2
(45) Date of Patent: May 18, 2021

(54) AUGMENTED REALITY MICROSCOPE FOR PATHOLOGY

(71) Applicant: Google LLC, Mountain View, CA (US)

(72) Inventor: Martin Christian Stumpe, Belmont, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/495,302

(22) PCT Filed: Jun. 13, 2017

(86) PCT No.: PCT/US2017/037212
§ 371 (c)(1),
(2) Date: Sep. 18, 2019

(87) PCT Pub. No.: WO2018/231204
PCT Pub. Date: Dec. 20, 2018

(65) Prior Publication Data
US 2020/0097727 A1    Mar. 26, 2020

(51) Int. Cl.
G06K 9/00      (2006.01)
G06N 20/00     (2019.01)
G02B 21/36     (2006.01)
G06T 7/00      (2017.01)

(52) U.S. Cl.
CPC ....... *G06K 9/00671* (2013.01); *G02B 21/361* (2013.01); *G02B 21/367* (2013.01); *G02B 21/368* (2013.01); *G06N 20/00* (2019.01); *G06T 7/0012* (2013.01); *G06T 2207/30024* (2013.01)

(58) Field of Classification Search
None
See application file for complete search history.

(56) References Cited

U.S. PATENT DOCUMENTS

| 9,462,944  | B2  |  10/2016 | Moeller et al. |
| 9,715,642  | B2  |  7/2017  | Szegedy et al. |
| 10,025,902 | B2  |  7/2018  | Barral |
| 10,692,209 | B2* |  6/2020  | Sashida ............... G06T 7/11 |

(Continued)

FOREIGN PATENT DOCUMENTS

| CN | 105266897    | 3/2018 |
| JP | 2011-181015 A | 9/2011 |

(Continued)

OTHER PUBLICATIONS

PCT International Search Report and Written Opinion, PCT International Application No. PCT/EP2017/037212, dated Oct. 20, 2017, 12 pages.

(Continued)

*Primary Examiner* — Edward Martello
(74) *Attorney, Agent, or Firm* — McDonnell Boehnen Hulbert & Berghoff LLP

(57) ABSTRACT

A microscope of the type used by a pathologist to view slides containing biological samples such as tissue or blood is provided with the projection of enhancements to the field of view, such as a heatmap, border, or annotations, substantially in real time as the slide is moved to new locations or changes in magnification or focus occur. The enhancements assist the pathologist in characterizing or classifying the sample, such as being positive for the presence of cancer cells or pathogens.

39 Claims, 6 Drawing Sheets

(56) References Cited

U.S. PATENT DOCUMENTS

| | | |
|---|---|---|
| 2006/0247514 A1 | 11/2006 | Panasyuk et al. |
| 2012/0044342 A1 | 2/2012 | Hing et al. |
| 2014/0098214 A1 | 4/2014 | Schlaudraff et al. |
| 2014/0313314 A1 | 10/2014 | Crandall et al. |
| 2015/0103401 A1 | 4/2015 | Park et al. |
| 2015/0213599 A1 | 7/2015 | Buzaglo et al. |
| 2016/0035093 A1 | 2/2016 | Kateb et al. |
| 2016/0140746 A1 | 5/2016 | Ranft et al. |
| 2016/0183779 A1 | 6/2016 | Ren et al. |
| 2016/0342891 A1 | 11/2016 | Ross et al. |
| 2016/0360117 A1 | 12/2016 | Elefteriu et al. |
| 2017/0169276 A1 | 6/2017 | Agaian et al. |
| 2017/0243085 A1 | 8/2017 | Vanhoucke et al. |

FOREIGN PATENT DOCUMENTS

| | | |
|---|---|---|
| JP | 2013-104964 A | 5/2013 |
| JP | 2014-078008 A | 5/2014 |
| JP | 2015-007769 A | 1/2015 |
| JP | 2016-189008 A | 11/2016 |
| JP | 2016-536594 A | 11/2016 |
| WO | 2016/130424 A1 | 8/2016 |
| WO | 2017/075687 A1 | 5/2017 |
| WO | 2018/156133 A1 | 8/2018 |

OTHER PUBLICATIONS

Diecei, M. V. et al., "Update on Tumor-Infiltrating Lymphocytes (TILs) in Breast Cancer, Including Recommendations to Assess TILs in Residual Disease After Neoadjuvant Therapy and in Carcinoma in situ: A Report of the International Immuno-Oncology Biomarker Working Group on Breast Cancer," Seminars in Cancer Biology, vol. 52, 2018, pp. 16-25.

Salgado, R. et al., "The Evaluation of Tumor-Infiltrating Lymphocytes (TILs) in Breast Cancer: Recommendations by an International TILs Working Group 2014," Annals of Oncology, vol. 26, No. 2, Feb. 2015, pp. 259-271.

Lecun, Y. et al., "Deep Learning," Nature, vol. 521, No. 7553, May 2015, pp. 436-444.

Gulshan, V. et al., "Development and Validation of a Deep Learning Algorithm for Detection of Diabetic Retinopathy in Retinal Fundus Photographs," JAMA, vol. 316, No. 22, Nov. 29, 2016, 9 pages.

Elmore, J. G. et al., "Diagnostic Concordance Among Pathologists Interpreting Breast Biopsy Specimens," JAMA, vol. 313, No. 11, Mar. 2015, pp. 1122-1132.

Bejnordi, B.E. et al., "Diagnostic Assessment of Deep Learning Algorithms for Detection of Lymph Node Metastases in Women With Breast Cancer," JAMA, vol. 318, No. 22, Dec. 2017, pp. 2199-2210.

Litjens, G. et al., "Deep Learning as a Tool for Increased Accuracy and Efficiency of Histopathological Diagnosis," Scientific Reports, vol. 6, May 2016, pp. 1-11.

Esteva, A. et al., "Dermatologist-Level Classification of Skin Cancer with Deep Neural Networks," Nature, vol. 542, Feb. 2017, pp. 115-118.

Liu, Y. et al., "Detecting Cancer Metastases on Gigapixel Pathology Images," arXiv:1703.02442v2, [cs.CV], Mar. 8, 2017, 13 pages.

Ting, D. S. W. et al., "Development and Validation of a Deep Learning System for Diabetic Retinopathy and Related Eye Diseases Using Retinal Images From Multiethnic Populations With Diabetes," JAMA, vol. 318, No. 22, Dec. 2017, pp. 2211-2223.

Janowczyk, A. et al., "Deep Learning for Digital Pathology Image Analysis: A Comprehensive Tutorial with Selected Use Cases," J. Pathol. Inform., vol. 7, Jul. 2016, 26 pages.

Poplin, R. et al., "Prediction of Cardiovascular Risk Factors From Retinal Fundus Photographs Via Deep Learning," Nature Biomedical Engineering, vol. 2, Mar. 2018, pp. 158-164.

Wang, D. et al., "Deep Learning for Identifying Metastatic Breast Cancer," arXiv:1606.05718v1 [q-bio.QM], Jun. 18, 2016, pp. 1-6.

Abadi, M. et al., "TensorFlow: A System for Large-Scale Machine Learning," Proceedings of the 12th USENIX Symposium on Operating Systems Design and Implementation, Nov. 2-4, 2016, 21 pages.

Szegedy, C., "Rethinking the Inception Architecture for Computer Vision," Proceedings of the IEEE Conference on Computer Vision and Pattern Recognition, 2016, pp. 2818-2826.

Shelhamer, E. et al., "Fully Convolutional Networks for Semantic Segmentation," IEEE Transactions on Pattern Analysis Machine Intelligence, vol. 39, No. 4, Apr. 2017, pp. 640-651.

Pirnstill, C. W., "Malaria Diagnosis Using a Mobile Phone Polarized Microscope," Science Reports, vol. 5, Aug. 2015, pp. 1-13.

Watson, J. et al., "Augmented Microscopy: Real-Time Overlay of Bright-Field and Near-Infrared Fluorescence Images", Journal of Biomedical Optics, vol. 20(10) Oct. 2015, 10 pages.

Edwards, P.J. et al., "Augmentation of Reality Using an Operating Microscope for Otolaryngology and Neurosurgical Guidance", Journal of Image Guided Surgery. vol. 1, No. 3, 1995, pp. 172-178.

Edwards, Philip J. et al., "Stereo Augmented Reality in the Surgical Microscope, Medicine Meets Virtual Reality," J.D. Westward et al (Eds.) IOS Press, 1999, p. 102-108.

Szegedy, C. et al., "Going Deeper with Convolutions", arXiv:1409.4842 [cs.CV] (Sep. 2014), 12 pages.

Szegedy, C. et al., "Rethinking the Inception Architecture for Computer Vision", arXiv:1512.00567 [cs.CV] (Dec. 2015), 10 pages.

Szegedy, C. et al., "Inception-v4, Inception-ResNet and the Impact of Residual Connections on Learning," arXiv:1602.0761 [cs.CV] (Feb. 2016) 7 pages.

Madabhushi, A. et al., "Image Analysis and Machine Learning in Digital Pathology: Challenges and Opportunities," Medical Image Analysis, vol. 33, 2016, p. 170-175.

Schaumberg, A., et al., "H&E-Stained Whole Slide Deep Learning Predicts SPOP Mutation State in Prostate Cancer", bioRxiv 064279; http:/bioRxiv.or/content/early/2016/07/17/064279, 2016, 14 pages.

Office Action dated Dec. 8, 2020 for Japanese Pat. App. No. 2019-553446 (English Translation Provided).

"Line**, Hot News"; Nikkei Electronics No. 1172 Nikkei Electronics, Japan, Nikkei BP (Sep. 20, 2015), pp. 20-21; Nikkei Business Publications, Inc., 2016. Note—This article is in Japanese. Please see translation of Japanese Office Action for Jap. Pat. App. No. 2019-553446 for a concise description of relevance.

"AI Chip Wound Generation, second Division : Visual of an automatic vehicle for edge driving ; A case where the plaintiff's goods are competitive with the reinforcing on-vehicle goods"; Nikkei Electronics No. 1175 Nikkei Electronics, Japan, Nikkei BP, Dec. 19, Nikkei Business Publications, Inc. (2016) pp. 39-45 Note—This article is in Japanese. Please see translation of Japanese Office Action for Jap. Pat. App. No. 2019-553446 for a concise description of relevance.

"Virtual Mouse Placenta: Tissue Layer Segmentation"; Tony Pan, et al.; Proceedings of the Annual International Conference of the IEEE Engineering in Medicine and Biology Society, vol. 27 No. vol. 3, pp. 3112-3116 (2005).

Anonymous: "AI accelerator—Wikipedia", May 30, 2017 (May 30, 2017), XP055706497, Retrieved from the Internet: URL: https://en.wikipedia.org/w/index.php?title=AI_accelerator&oldid=782985149 [retrieved on Jun. 18, 2020].

Feizi, Alborz et al. "Lensfree on-chip microscopy achieves accurate measurement of yeast cell viability and concentration using machine learning" 2017 Conference on Lasers and Electro-Optics (CLEO), The Optical Society (2017), pp. 1-2.

The Extended European Search Report for PCT/US2017/037212 dated Jun. 29, 2020, pp. 1-11.

\* cited by examiner

AUGMENTED REALITY MICROSCOPE FOR PATHOLOGY

CROSS-REFERENCE TO RELATED APPLICATION

The present application is a national stage entry of PCT/US2017/037212 filed Jun. 13, 2017, the content of which is hereby incorporated by reference.

FIELD

This disclosure relates to the field of pathology and more particularly to an improved microscope system and method for assisting a pathologist in classifying biological samples such as blood or tissue, e.g., as containing cancer cells or containing a pathological agent such as plasmodium protozoa or tuberculosis bacteria.

BACKGROUND

In order to characterize or classify a biological sample such as tissue, the sample is placed on a microscope slide and a pathologist views it under magnification with a microscope. The sample may be stained with agents such as hematoxylin and eosin (H&E) to make features of potential interest in the sample more readily seen. Alternatively, the sample may be stained and scanned with a high resolution digital scanner, and the pathologist views magnified images of the sample on a screen of a workstation or computer.

For example, the assessment of lymph nodes for metastasis is central to the staging of many types of solid tumors, including breast cancer. The process requires highly skilled pathologists and is fairly time-consuming and error-prone, especially for nodes that are negative for cancer or have a small foci of cancer. The current standard of care involves examination of digital slides of node biopsies that have been stained with hematoxylin and eosin. However, there are several limitations inherent with manual reads including reader fatigue, and intra and inter-grader reliability that negatively impact the sensitivity of the process. Accurate review and assessment of lymph node biopsy slides is important because the presence of tumor cells in the lymph node tissue may warrant new or more aggressive treatment for the cancer and improve the patient's chances of survival.

The prior art includes descriptions of the adaptation of deep learning techniques and trained neural networks to the context of digital tissue images in order to improve cancer diagnosis, characterization and/or staging. Pertinent background art includes the following articles: G. Litjens, et al., *Deep learning as a tool for increasing accuracy and efficiency of histopathological diagnosis*, www.nature.com/scientificreports 6:26286 (May 2016); D. Wang et al., *Deep Learning for Identifying Metastatic Breast Cancer*, arXiv: 1606.05718v1 (June 2016); A. Madabhushi et al., *Image analysis and machine learning in digital pathology: Challenges and opportunities*, Medical Image Analysis 33, p. 170-175 (2016); A. Schuamberg, et al., *H&E-stained Whole Slide Deep Learning Predicts SPOP Mutation State in Prostate Cancer*, bioRxiv preprint http://bioRxiv.or/content/early/2016/07/17/064279. Additional prior art of interest includes Quinn et al., *Deep Convolutional Neural Networks for Microscopy-based Point of Care Diagnostics*, Proceedings of International Conference on Machine Learning for Health Care 2016.

The art has described several examples of augmenting the field of view of a microscope to aid in surgery. See U.S. patent application publication 2016/0183779 and published PCT application WO 2016/130424A1. See also Watson et al., *Augmented microscopy: real-time overlay of bright-field and near-infrared fluorescence images*, Journal of Biomedical Optics, vol. 20 (10) October 2015.

SUMMARY

In one aspect, a method is described for assisting in review of a microscope slide containing a biological sample (blood, tissue, sputum, stool, etc.) with a microscope. The method includes a step of capturing a magnified digital image of the field of view of the sample as seen through the eyepiece of the microscope with a camera. A machine learning pattern recognizer receives the image and identifies areas of interest in the sample from the data in the digital image. Such areas of interest could be areas likely containing cancer cells, or in other applications identification of plasmodium protozoa in a blood sample which causes malaria or tuberculosis bacterium in a sputum sample. The method further includes a step of superimposing an enhancement as an overlay on the field of view through the microscope eyepiece. The enhancement can take several forms, depending on the particular application, such as "heat maps" or color coded regions having a high likelihood for containing cancer cells, regions of interest boundaries, annotations (such as Gleason score for a prostate tissue sample), measurements or other indicia. As the user moves the sample relative to the microscope optics or changes magnification or focus, new images are captured by the camera and supplied to the machine learning pattern recognizer, and new region of interest boundaries, annotations, and/or other types of enhancements are overlaid onto the field of view through the eyepiece. This display of new enhancements, superimposed on the field of view happens in substantial real time (i.e., within a few seconds or even fraction of a second) as the pathologist moves the slide relative to the microscope optics, changes focus, or changes magnification and continues to observe the specimen through the eyepiece. The overlaid enhancements assist the pathologist in classifying or characterizing the biological sample, e.g., as containing cancerous cells or tissue, or containing pathogens, depending on the type of sample.

This disclosure can also be characterized as a system in the form of a microscope having a stage for holding a slide containing a biological sample and an eyepiece, a digital camera capturing a magnified digital image of the sample as seen through the eyepiece of the microscope, and a compute unit including a machine learning pattern recognizer which receives the images from the camera. The pattern recognizer is trained to perform "inference", that is, identify regions of interest (e.g., cancerous cells or tissue, pathogens such as viruses, protozoa or bacteria, eggs from parasites, etc.) in biological samples of the type currently placed on the stage. The pattern recognizer recognizes regions of interest on the image captured by the camera. The compute unit generates an enhancement which is overlaid on the view through the eyepiece, in the form of region of interest boundaries, annotations, a heatmap, and/or other information. Additional enhancements are generated as the user moves the sample relative to the microscope, or changes magnification or focus.

In an aspect there is provided a method for assisting a user in review of a slide containing a biological sample with a microscope having an eyepiece comprising the steps of: (a) capturing, with a camera, a digital image of a view of the sample as seen through the eyepiece of the microscope, (b)

using a machine learning pattern recognizer to identify areas of interest in the sample from the image captured by the camera, and (c) superimposing an enhancement to the view of the sample as seen through the eyepiece of the microscope as an overlay, wherein the enhancement is based upon the identified areas of interest in the sample, (d) wherein, when the sample is moved relative to the microscope optics or when a magnification or focus of the microscope changes, a new digital image of a new view of the sample is captured by the camera and supplied to the machine learning pattern recognizer, and a new enhancement is superimposed onto the new view of the sample as seen through the eyepiece in substantial real time, whereby the enhancement assists the user in classifying or characterizing the biological sample.

Step (b) may further comprise the step of using an inference accelerator to facilitate substantial real-time generation of the enhancements. The method may further comprise the step of providing an interface in a compute unit coupled to the microscope to receive and store locally in the compute unit a new machine learning pattern recognizer, for different types of biological samples. The biological sample may be of a type selected from the group of samples consisting of tissue, a lymph node, blood, sputum, urine, stool, water, soil and food. The region of interest may comprise cancerous cells or tissue, cellular structures, types of cells, or a pathogen, wherein the pathogen is optionally a pathogen selected from the group consisting of plasmodium, tuberculosis bacterium, malaria protozoa, virus, egg of parasites. The enhancement may be selected from the group of enhancements consisting of a heatmap, a region of interest boundary, an annotation, a Gleason score, a classification likelihood prediction, a cell count, and a physical measurement, wherein the physical measurement is optionally a tumor diameter. The method may further comprise the step of displaying on a monitor of a workstation associated with the microscope one or more image regions from one or more other samples that are similar to the sample in the current view of the microscope. The method may further comprise the step of displaying metadata associated with the displayed one or more other samples.

The method may further comprise the step of outputting image data of the view of the sample as seen through the eyepiece of the microscope and the enhancement to an external display. The microscope may further comprise a motorized stage for supporting and moving the slide relative to the eyepiece, and wherein the method further comprises the step of using the microscope motorized stage and digital camera, and machine learning pattern recognizer to perform a preliminary detection of areas of potential interest in the biological sample. The method may further comprise the step of controlling the motorized stage to move the stage to place the areas of potential interest for viewing by the user and generating an enhancement at each of the areas of potential interest. The method may further comprise the step of integrating the view of the sample of the microscope with the superimposed enhancement with a separate digital image of the sample obtained from a whole slide scanning of the slide containing the biological sample to generate an integrated view of the sample. The method may further comprise the step of highlighting the view of the sample on the integrated view of the sample. The microscope may further comprise a motorized stage for supporting and moving the slide relative to the eyepiece, and wherein the method further comprises the step of designating an area on the separate digital image and moving the motorized stage such that the designated area is in the field of view of the microscope. The method may further comprise projecting information associated with the designated area on the separate digital image as an enhancement to the view of the sample, wherein the projected information optionally comprises labels and/or annotations.

The method may further comprise the step of downloading from a remote data source over a network additional ensembles of machine learning pattern recognizers. The method may further comprise: receiving data indicating a magnification of the microscope; and selecting a machine learning pattern recognizer of a plurality of machine learning pattern recognizers based upon the received data. The selected machine learning pattern recognizer may be used to identify areas of interest in the sample from the image captured by the camera.

In an aspect there is provided a system for assisting a user in review of a slide containing a biological sample, comprising: a microscope having a stage for holding a slide containing a biological sample, at least one objective lens, and an eyepiece, a digital camera configured to capture digital images of a view of the sample as seen through the eyepiece of the microscope, a compute unit comprising a machine learning pattern recognizer configured to receive the digital images from the digital camera, wherein the pattern recognizer is trained to identify regions of interest in biological samples of the type currently placed on the stage, and wherein the pattern recognizer recognizes regions of interest on a digital image captured by the camera and wherein the compute unit generates data representing an enhancement to the view of the sample as seen through the eyepiece of the microscope, wherein the enhancement is based upon the regions of interest in the sample; and one or more optical components coupled to the eyepiece for superimposing the enhancement on the field of view; wherein the camera, compute unit and one or more optical components are configured such that when the sample is moved relative to the microscope optics or when a magnification or focus of the microscope changes, a new digital image of a new view of the sample is captured by the camera and supplied to the machine learning pattern recognizer, and a new enhancement is superimposed onto the new field of view of the sample as seen through the eyepiece in substantial real time.

The camera may be operated substantially continuously capturing digital images at a frame rate. The system may further comprise an inference accelerator operating on the digital images facilitating substantial real-time generation of the enhancements. The system may further comprise an interface in the compute unit to a portable computer storage medium containing new machine learning pattern recognizers for different types of biological samples. The biological sample may be of a type selected from the group of samples consisting of tissue, a lymph node, blood, sputum, urine, stool, water, soil and food. The region of interest may comprise cancerous cells or tissue, cellular structures, types of cells, or a pathogen, wherein the pathogen is optionally selected from the group consisting of plasmodium, tuberculosis bacterium, malaria protozoa, virus, egg of parasites). The enhancement may be selected from the group of enhancements consisting of a heatmap, a region of interest boundary, an annotation, a Gleason score, a classification likelihood prediction, a cell count, and a physical measurement, wherein the physical measurement is optionally a tumor diameter. The system may further comprise an external workstation associated with the microscope having a display displaying one or more image regions from one or more other samples that are similar to the sample in the current view of the microscope. The display may display metadata associated with the displayed one or more other samples. The system may further comprise a display, and wherein the compute unit outputs image data of the view of the sample as seen through the microscope and the enhancement on the display.

The microscope stage may comprise a motorized stage for supporting and moving the slide relative to the eyepiece, and wherein the microscope, motorized stage, digital camera, and machine learning pattern recognizer operated in a mode to perform a preliminary detection of areas of potential interest in the biological sample. The motor may be configured to move the stage to place each of the areas of potential interest for viewing by the user and wherein the compute unit and one or more optical components generate an enhancement at each of the areas of potential interest. The system may further comprise an external workstation having a display coupled to the compute unit and wherein the view of the sample on the microscope with the superimposed enhancement is integrated and displayed on the display with a separate digital image of the sample obtained from a whole slide scanning of the slide containing the biological sample to generate an integrated view of the sample. The compute unit may be in the form of a general purpose computer having an interface to the digital camera and an interface to the one or more optical components. The compute unit may further comprise an interface to a computer network.

In a further aspect there is provided, in a microscope system having a microscope eyepiece, a stage for holding a slide containing a sample, and a digital camera for capturing images of the field of view of the microscope eyepiece, the improvement comprising: a compute unit coupled to the microscope comprising an ensemble of deep neural network pattern recognizers coupled to the microscope trained on a set of slides of samples at different magnifications, the ensemble receiving the images generated by the camera.

The compute unit may further comprise an interface to a portable computer storage medium containing new machine learning pattern recognizers for different types of biological samples or applications of the microscope.

In a further aspect there is provided an apparatus comprising, in combination: a collection of portable computer storage media each containing different machine learning pattern recognizers for different types of biological samples to be viewed by a pathologist using a microscope, each of the of the different machine learning pattern recognizers in the form of an ensemble of machine learning pattern recognizers trained at different magnification levels.

In a further aspect there is provided a method of training a machine learning pattern recognizer, comprising: a) obtaining whole slide images of a multitude of slides containing biological samples of a given type; b) performing parametric deformations on the whole slide images in order to simulate the optical quality of digital images captured by a camera coupled to the eyepiece of a microscope; and c) training the machine learning pattern recognizer using whole slide images as deformed in step b).

In a further aspect there is provided a method of training a machine learning pattern recognizer, comprising: a) with a microscope of the type used by a pathologist having a camera and more than one objective lenses, obtaining a multitude of digital images of a biological sample in the field of view of the microscope at different magnifications provided by the more than one objective lenses of the microscope; and b) training an ensemble of machine learning pattern recognizers using the images obtained in step a), each member of the ensemble trained at a particular magnification associated with one of the objective lenses.

The method may further comprise the step of repeating steps a) and b) for different types of biological samples thereby generating a plurality of different ensembles of machine learning pattern recognizers. The method may further comprise the step of storing each the plurality of different ensembles of machine learning pattern recognizers onto portable computer storage media.

The methods and system of this disclosure enables several significant advantages, including substantial real time display of regions of interest enhancements in the field of view of the microscope. The optical path itself is not disrupted, i.e., the pathologist still looks at the actual slide in the field of view of the microscope eyepiece, not a digital representation. The enhancements which are overlaid on the field of view can take a variety of forms, which can be tailored to the type of sample. Furthermore, in some embodiments a modular approach to the hardware and software design allows for any kind of detection or classification pattern recognition model to be run in the compute unit. Examples include:

a) general tumor or cancerous cells presence, e.g., prostate cancer, breast cancer, or presence of cancer in lymph node tissue;

b) detection of malaria parasites or tuberculosis bacterium in a sample;

c) detection of histological features like macrophages, etc.;

d) deep characterization of a tissue sample, e.g., detection of prostate tissue exhibiting Gleason 3 and Gleason 4 characteristics, and user selection of levels or degrees of characterization;

d) beyond pathology, any detection or classification task using an optical microscope, for example quality control inspection of electronic components.

The method and system of this disclosure offers several advantages over the pathologist identification of areas of interest from scanned digital images, and presents an attractive new alternative methodology for pathology in general. First of all, pathologists are used to viewing physical glass slides on microscopes rather than digital images on a screen. Microscopes have a larger field of view and enable focusing in the z-plane, which is not always the case with whole slide scanned images, which in many formats only capture images at an optimum but single depth of focus. A physical microscope often has better optical qualities than a scanned digital image, which is useful for diagnosis or characterization of borderline cases. Additionally, a pathologist does not have to worry about whether a whole slide scanner missed a small tissue fragment or was out of focus in a small field of view. Furthermore, use of physical slides enables quick diagnosis, with no need for delay with scanning and uploading slides. Additionally, whole slide scanners and associated equipment and workstations are very expensive, costing in some cases hundreds of thousands of dollars, orders of magnitude more than microscopes having the features of this disclosure.

Furthermore, the small form factor of a table-top microscope and low power requirements make it feasible to use the microscope of this disclosure in remote areas, e.g., malaria detection or cancer screening in Africa or remote Pacific islands. Additionally, by providing the ability to run inference locally or offline, no data needs to be uploaded, which eliminates data sharing restrictions, internet connectivity, as well as upload bandwidth requirements.

In another aspect of this disclosure a system includes a compute unit storing an ensemble of deep neural network pattern recognizers trained on a set of slides at different magnifications, coupled to a microscope having a digital camera and optics for superimposing or overlaying enhancements onto the current view through the microscope eyepiece. In one embodiment, there are several of such ensembles, one for each type of pattern recognition application, stored on discrete portable computer storage media, such as for example an SD card or the like. We envision a modular system in which the compute unit has an interface (e.g., SD card slot) for receiving any one of a multitude of individual SD cards each loaded with an ensemble of pattern recognizers for a particular application (e.g., breast cancer detection, prostate cancer detection, malaria detection, etc.), enabling the microscope to be fitted and upgraded with the software and models for different pathology applications as the needs of the pathologist evolve.

Alternatively, the interface in the compute unit may connect to a local or wide area network, such as the internet, and additional ensembles of machine learning pattern recognizers could be downloaded to the compute unit from a remote location, such as a remote data store, the cloud, or a remote server.

As used in this document, the term "biological sample" is intended to be defined broadly to encompass blood or blood components, tissue or fragments thereof from plants or animals, sputum, stool, urine or other bodily substances, as well as water, soil or food samples potentially containing pathogens.

DETAILED DESCRIPTION

Figure 1:
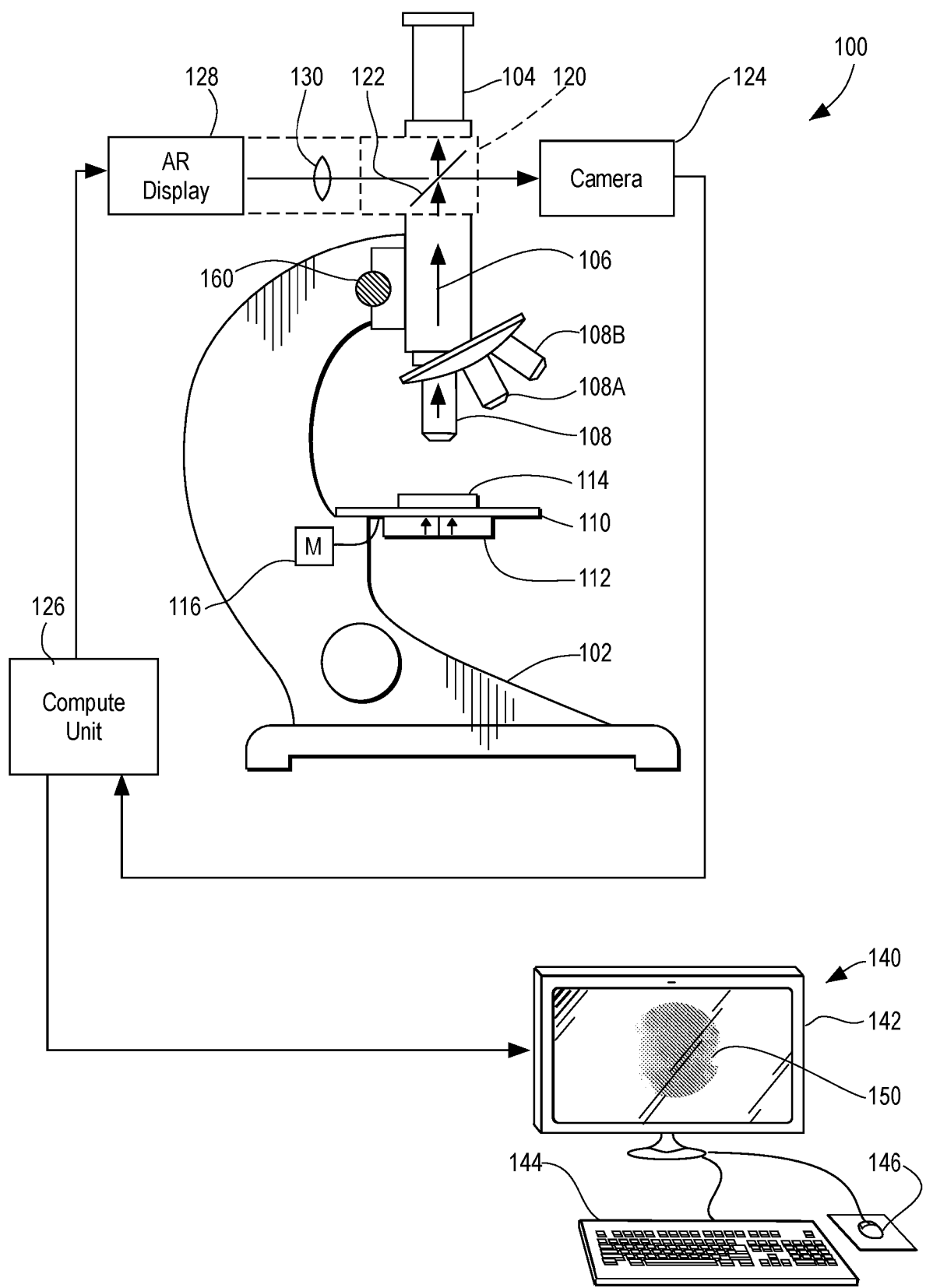
FIG. 1 is a schematic diagram of an augmented reality microscope system for pathology, which is shown in conjunction with an optional connected pathologist workstation.

FIG. 1 is a schematic diagram of an augmented reality microscope system 100 for pathology, which is shown in conjunction with an optional connected pathologist workstation 140. The system 100 includes a conventional pathologist microscope 102 which includes an eyepiece 104 (optionally a second eyepiece in the case of a stereoscopic microscope). A stage 110 supports a slide 114 containing a biological sample. An illumination source 112 projects light through the sample. A microscope objective lens 108 directs an image of the sample as indicated by the arrow 106 to an optics module 120. Additional lenses 108A and 108B are provided in the microscope for providing different levels of magnification. A focus adjustment knob 160 allows the user to change the depth of focus of the lens 108.

The microscope includes an optics module 120 which incorporates a component, such as a semitransparent mirror 122 or beam combiner/splitter for overlaying an enhancement onto the field of view through the eyepiece. The optics module 120 allows the pathologist to see the field of view of the microscope as he would in a conventional microscope, and, on demand or automatically, see an enhancement (heat map, boundary or outline, annotations, etc.) as an overlay on the field of view which is projected into the field of view by an augmented reality (AR) display generation unit 128 and lens 130. The image generated by the display unit 128 is combined with the microscope field of view by the semitransparent mirror 122. As an alternative to the semitransparent mirror, a liquid crystal display (LCD) could be placed in the optical path that uses a transmissive negative image to project the enhancement into the optical path.

The optics module 120 can take a variety of different forms, and various nomenclature is used in the art to describe such a module. For example, it is referred to as a "projection unit", "image injection module" or "optical see-through display technology." Literature describing such units include US patent application publication 2016/0183779 (see description of FIGS. 1, 11, 12, 13) and published PCT application WO 2016/130424A1 (see description of FIGS. 2, 3, 4A-4C); Watson et al., *Augmented microscopy: real-time overlay of bright-field and near-infrared fluorescence images*, Journal of Biomedical optics, vol. 20 (10) October 2015; Edwards et al., *Augmentation of Reality Using an Operating Microscope*, J. Image Guided Surgery. Vol. 1 no. 3 (1995); Edwards et al., *Stereo augmented reality in the surgical microscope*, Medicine Meets Virtual Reality (19997) J. D. Westward et al (eds.) IOS Press, p. 102.

The semi-transparent mirror 122 directs the field of view of the microscope to both the eyepiece 104 and also to a digital camera 124. A lens for the camera is not shown but is conventional. The camera may take the form of a high resolution (e.g., 16 megapixel) video camera operating at say 10 or 30 frames per second. The digital camera captures magnified images of the sample as seen through the eyepiece of the microscope. Digital images captured by the camera are supplied to a compute unit 126. The compute unit 126 will be described in more detail in FIG. 5. Alternatively, the camera may take the form of an ultra-high resolution digital camera such as APS-H-size (approx. 29.2×20.2 mm) 250 megapixel CMOS sensor developed by Cannon and announced in September 2015.

Briefly, the compute unit 126 includes a machine learning pattern recognizer which receives the images from the camera. The machine learning pattern recognizer may take the form of a deep convolutional neural network which is trained on a set of microscope slide images of the same type as the biological specimen under examination. Additionally, the pattern recognizer will preferably take the form of an ensemble of pattern recognizers, each trained on a set of slides at a different level of magnification, e.g., 5×, 10×, 20×, 40×. The pattern recognizer is trained to identify regions of interest in an image (e.g., cancerous cells or tissue, pathogens such as viruses or bacteria, eggs from parasites, etc.) in biological samples of the type currently placed on the stage. The pattern recognizer recognizes regions of interest on the image captured by the camera 124. The compute unit 126 generates data representing an enhancement to the view of the sample as seen by the user, which is generated and projected by the AR display unit 128 and combined with the eyepiece field of view by the semitransparent mirror 122.

The essentially continuous capture of images by the camera 124, rapid performance of interference on the images by the pattern recognizer, and generation and projection of enhancements as overlays onto the field of view, enables the system 100 of FIG. 1 to continue to provide enhancements to the field of view and assist the pathologist in characterizing or classifying the specimen in substantial real time as the operator navigates around the slide (e.g., by use of a motor 116 driving the stage), by changing magnification by switching to a different objective lens 108A or 108B, or by changing depth of focus by operating the focus knob 160. This is a substantial advance in the art and improvement over conventional pathology using a microscope.

By "substantial real time," we mean that an enhancement or overlay is projected onto the field of view within 10 seconds of changing magnification, changing depth of focus, or navigating and then stopping at a new location on the slide. In practice, as explained below, with the optional use of inference accelerators, we expect that in most cases the new overlay can be generated and projected onto the field of view within a matter of a second or two or even a fraction of a second of a change in focus, change in magnification, or change in slide position.

In summary then, a method is disclosed of assisting a user (e.g., pathologist) in review of a slide 114 containing a biological sample with a microscope 102 having an eyepiece 104. The method includes a step of capturing with a camera 124 a digital image of the sample as seen by the user through the eyepiece of the microscope, using a machine learning pattern recognizer (200, FIG. 5, FIG. 8) to identify areas of interest in the sample from the image captured by the camera 124, and superimposing an enhancement to the view of the sample as seen by the user through the eyepiece of the microscope as an overlay. As the user moves the sample relative to the microscope optics or changes magnification or focus of the microscope, a new image is captured by the camera and supplied to the machine learning pattern recognizer, and a new enhancement is overlaid onto the new view of the sample as seen through the eyepiece in substantial real time. The overlaid enhancement assists the user in classifying the biological sample.

Figure 2A:
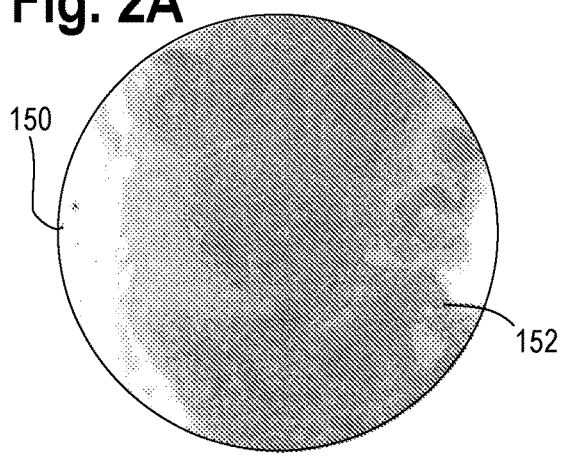
FIG. 2A is an illustration of the field of view of a microscope showing a breast cancer specimen at a given magnification level, for example 10×.
Figure 2B:
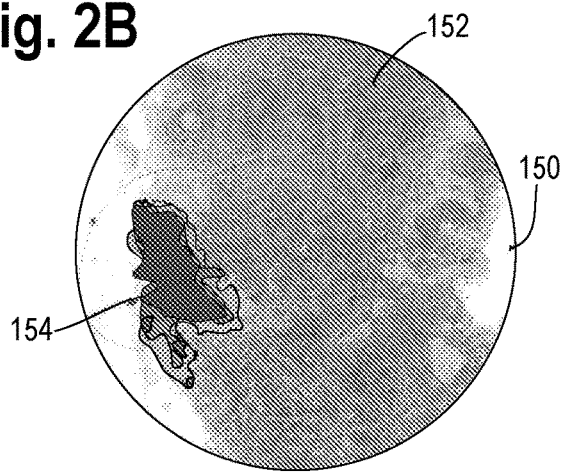
FIG. 2B is an illustration of an augmented view seen by the pathologist using the microscope of FIG. 1, with an enhancement in the form of a "heat map" superimposed on the field of view in registry will cells in the sample which are likely to be cancerous. The superimposing of the heat map in FIG. 2B assists the pathologist in characterizing the sample because it directs their attention to areas of interest that are particularly likely to be cancerous. If the pathologist were to change microscope objective lenses in order to zoom in on the heat map area of FIG. 2B (e.g., change to a 40× lens) a new field of view of the sample would be seen through the microscope eyepiece, a new image captured, and in substantial real time (e.g., with a second or two) a new heat map would be overlaid on the field of view (not shown) to further aid the pathologist's investigation of the sample.
Figure 7:
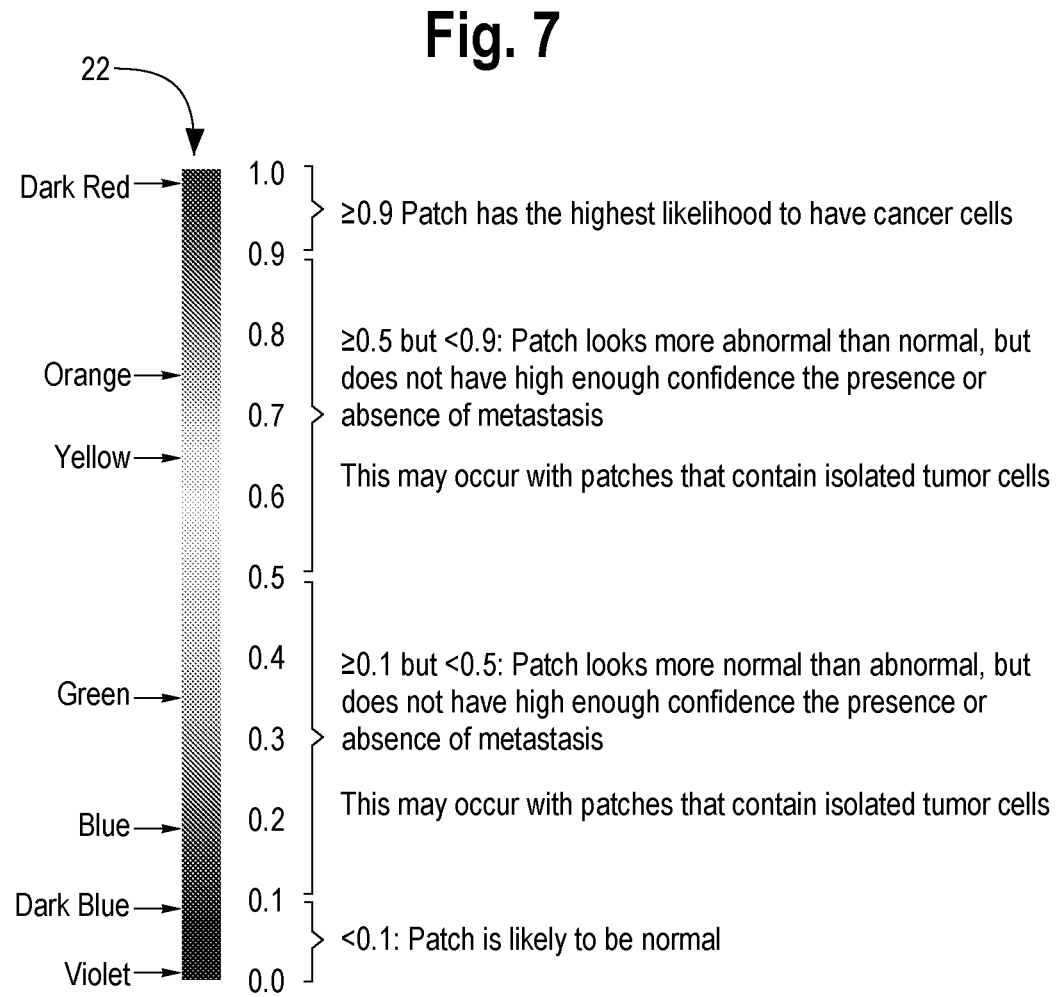
FIG. 7 is a chart showing a color code or scale for interpreting an enhancement in the form of a heat map.

FIG. 2A is an illustration of the field of view 150 of a microscope showing a breast cancer specimen 152 at a given magnification level, for example 10×. FIG. 2A shows the field of view with no enhancement, as would be the case with a prior art microscope. FIG. 2B is an illustration of an augmented view seen by the pathologist using the microscope of FIG. 1, with an enhancement 154 in the form of a "heat map" superimposed on the field of view in registry will cells in the sample which are likely to be cancerous. The "heat map" is a set of pixels representing tissue likely to be cancerous which are colored in accordance with the code of FIG. 7 to highlight areas (e.g. in red) which have a high probability of containing cancerous cells. The superimposing of the heat map 154 in FIG. 2B assists the pathologist in characterizing the sample because it directs their attention to areas of interest that are particularly likely to be cancerous. If the pathologist were to change microscope objective lenses (e.g., select lens 108A in FIG. 1) in order to zoom in on the heat map area 154 of FIG. 2B (e.g., change to a 40× lens), a new field of view of the sample would be seen through the microscope eyepiece and directed to the camera. The camera 124 captures a new image, and in substantial real time (e.g., with a second or two) a new heat map 154 (not shown) would be generated and overlaid on the field of view to further aid the pathologist's investigation of the sample at the higher magnification.

In one possible configuration, the microscope 102 includes a capability to identify which microscope objective lens is currently in position to image the sample, e.g., with a switch or by user instruction to microscope electronics controlling the operation of the turret containing the lenses, and such identification is passed to the compute unit 126 using simple electronics so that the correct machine learning pattern recognition module in an ensemble of pattern recognizers (see FIG. 8 below) is tasked to perform inference on the new field of view image.

Figure 3A:
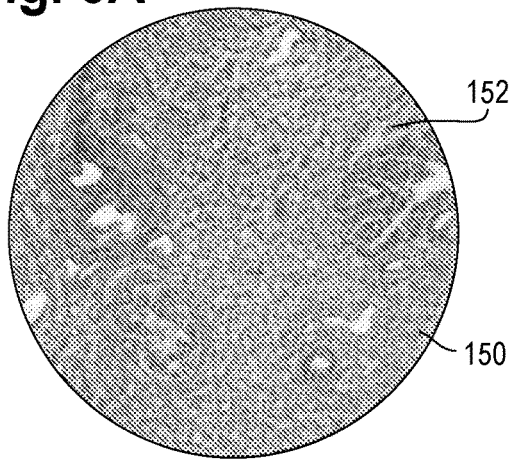
FIG. 3A is an illustration of the field of view of a microscope showing a prostate cancer specimen at a given magnification level, for example 10×.
Figure 3B:
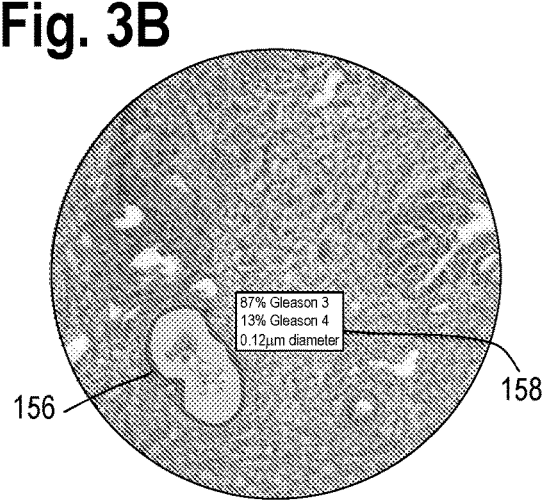
FIG. 3B is an illustration of an augmented view seen by the pathologist using the microscope of FIG. 1, with an enhancement in the form of an outline superimposed on the field of view circumscribing cells in the sample which are likely to be cancerous. The enhancement further includes a text box providing annotations, in this example Gleason score grading and tumor size data. The superimposing of the outline and annotations FIG. 3B assists the pathologist in characterizing the sample because it directs their attention to areas of interest that are particularly likely to be cancerous and provides proposed scores for the sample. If the pathologist were to change focal plane position or depth (i.e., adjust focus of the microscope) in order to probe the area of interest within the outline at different depths, a new field of view of the sample would be seen through the microscope eyepiece and captured by the camera, and in substantial real time (e.g., within a second or two) a new enhancement (not shown), e.g., outline and annotation text box, would be overlaid on the field of view to further aid the pathologist's investigation of the sample.

FIG. 3A is an illustration of the field of view 150 of a microscope showing a prostate cancer specimen at a given magnification level, for example 10×, as it would be in a conventional microscope without the capability of this disclosure. FIG. 3B is an illustration of an augmented field of view 150 seen by the pathologist using the microscope of FIG. 1, with an enhancement in the form of an outline 156 superimposed on the field of view circumscribing cells in the sample which are likely to be cancerous. The enhancement further includes a text box 158 providing annotations, in this example Gleason score grading and size measurements. In this particular example, the annotations are that 87 percent of the cells within the outline are Gleason grade 3 score, 13 percent of the cells are Gleason grade 4 score, and the tumor composed of cells of Gleason grade 4 score has a diameter of 0.12 µm.

Another possible enhancement is a confidence score that the cells of the sample are cancerous. For example, the enhancement could take the form of a probability or confidence score, such as 85% confidence that the cells in the outline are Gleason Grade 3, and 15% confidence that the cells in the outline are Gleason Grade 4. Additionally, the measurement (0.12 µm) could be the diameter of the whole outlined region.

The superimposing of the outline and annotations FIG. 3B assists the pathologist in characterizing the sample because it directs their attention to areas of interest that are particularly likely to be cancerous and provides proposed scores for the sample. If the pathologist were to change depth of focus of the microscope in order to probe the area of interest within the outline 156, a new field of view of the sample would be seen through the microscope eyepiece and captured by the camera 124, and in substantial real time (e.g., within a second or two) a new enhancement, e.g., outline and annotation text box, would be overlaid on the field of view (not shown) to further aid the pathologist's investigation of the sample. The system of FIG. 1 optionally includes the ability for the pathologist to turn on or off the enhancement projections, e.g., by providing controls for the system on the attached workstation 140 of FIG. 1, providing a simple user interface on the compute unit 126, or by a foot switch that turns on and off the AR display unit 128.

Figure 4A:
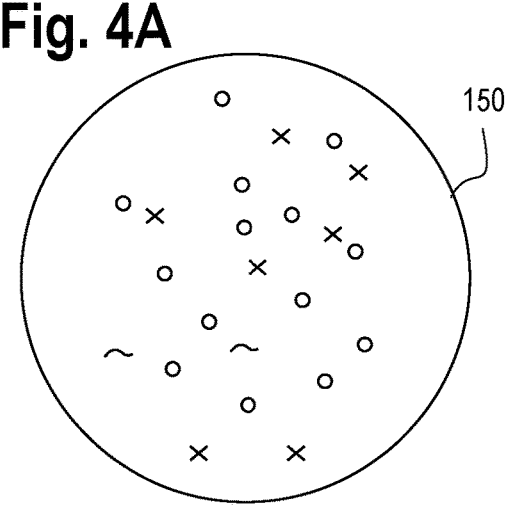
FIG. 4A is an illustration of the field of view through the microscope of a blood sample at low magnification.
Figure 4B:
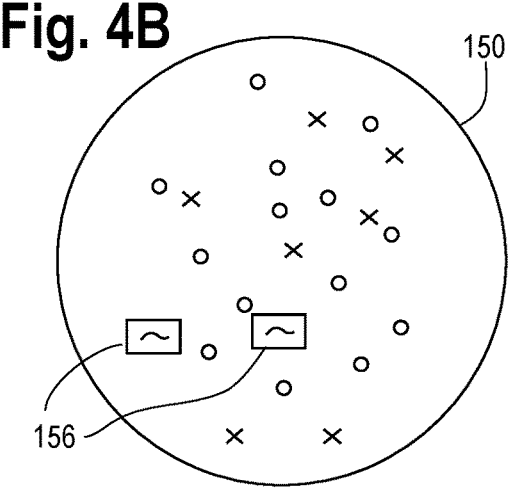
FIG. 4B shows the field of view of FIG. 4A but with an enhancement in the form of rectangles identifying malaria parasites (plasmodium) present in the sample overlaid on the field of view to assist the pathologist in characterizing the sample.

FIG. 4A is a hypothetical illustration of the field of view 150 through the microscope of a blood sample at low magnification, as it would be seen in a conventional microscope. The view includes various blood fragments (red and white blood cells) and components such as platelets. FIG. 4B shows the same field of view of FIG. 4A but with an enhancement in the form of rectangles 156 identifying malaria parasites (plasmodium) present in the sample overlaid on the field of view to assist the pathologist in characterizing the sample, in this case as positive for malaria.

Table 1 below lists optical characteristics of a typical microscope for pathology and the digital resolution of a camera 124 which could be used in FIG. 1.

TABLE 1

| Objective | Field of View (diameter) | Digital resolution (µm per pixel)* | Used for |
|---|---|---|---|
| 4x | 4.5 mm | 3.5 | Low power (screening) |
| 10x | 1.8 mm | 1.4 | Low power (tissue morphology) |
| 20x | 0.9 mm | 0.7 | Medium power |
| 40x | 0.45 mm | 0.35 | High power (cellular detail) |
| 100x | 0.18 mm | 0.14 | Special purpose (cytology, e.g. malaria) needs special optics with oil immersion |

*based on an 16 MP camera

Figure 5:
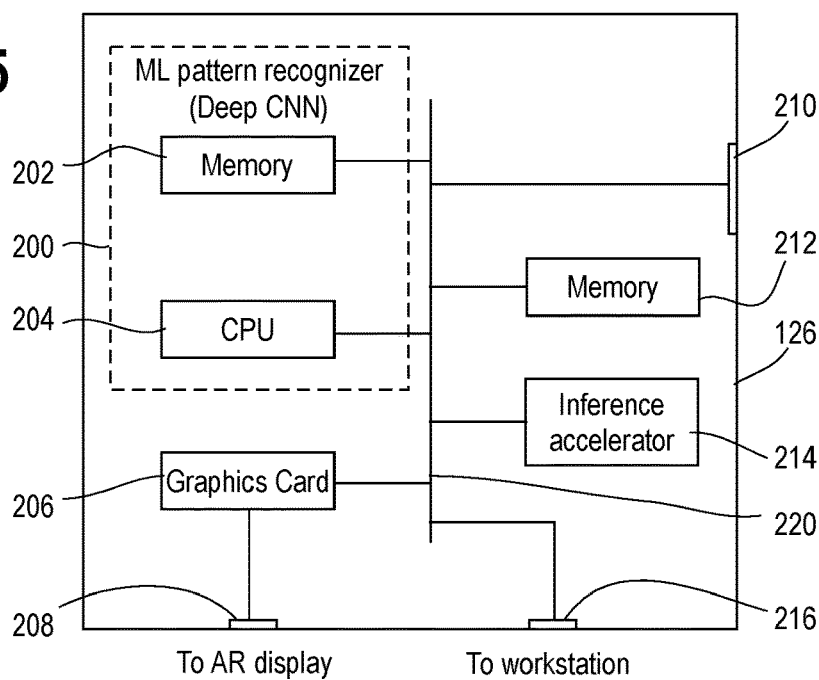
FIG. 5 is a more detailed block diagram of the compute unit of FIG. 1.

FIG. 5 is a block diagram of one possible form of the compute unit 126 of FIG. 1. Essentially, in one possible configuration the compute unit is a special purpose computer system designed to perform the required tasks of the system of FIG. 1, including performing inference on captured images, generation of digital data for overlays for the field of view, optional inference acceleration to perform the inference operations sufficiently quickly to enable substantial real time display of enhancements, as well as the capability to load additional machine learning models (pattern recognizers) to support additional pathology tasks.

In FIG. 5, the compute unit includes a deep convolutional neural network pattern recognizer 200 in the form of a memory 202 storing processing instructions and parameters for the neural network and a central processing unit 204 for performance of inference on a captured image. The module may also include a graphics card 206 for generating overlay digital data (e.g. heat maps, annotations, outlines, etc.) based on the inference results from the pattern recognizer 200. A memory 212 includes processing instructions for selecting the appropriate machine learning model based on the current magnification level, and coordinate sharing of the image of the field of view with a remote workstation 140 (FIG. 1), and other tasks as explained herein. The compute unit may also include an inference accelerator 214 to speed up the performance of inference on captured images. The compute unit further includes various interfaces to other components of the system including an interface, not shown, to receive the digital images from the camera, such as a USB port, an interface (e.g., network cable port or HDMI port) 208 to send digital display data to the AR display unit 128, an interface (e.g., network cable port) 216 to the workstation 140, and an interface 210 (e.g., SC card reader) enabling the compute unit to receive and download portable media containing additional pattern recognizers (see FIG. 9) to expand the capability of the system to perform pattern recognition and overlay generation for different pathology applications. A high speed bus 220 or network connects the modules in the compute unit 126. In practice, additional hard disk drives, processors, or other components may be present in the compute unit, the details of which are not particularly important.

In another possible configuration, the compute unit 126 could take the form of a general purpose computer (e.g., PC) augmented with the pattern recognizer(s) and accelerator, and graphics processing modules as shown in FIG. 5. The personal computer has an interface to the camera (e.g., a USB port receiving the digital image data from the camera), an interface to the AR projection unit, such as an HDMI port, and a network interface to enable downloading of additional pattern recognizers and/or communicate with a remote workstation as shown in FIG. 1.

In use, assuming multiple different pattern recognizers are loaded into the compute unit, an automatic specimen type detector or manual selector switches between the specimen dependent pattern recognition models (e.g. prostate cancer vs breast cancer vs malaria detection), and based on that the proper machine learning pattern recognizer or model is chosen. Movement of the slide to a new location (e.g., by use of a motor 116 driving the stage) or switching to another microscope objective 108 (i.e. magnification) triggers an update of the enhancement, as explained previously. Optionally, if only the magnification is changed, an ensemble of different models operating at different magnification levels (see FIG. 8) performs inference on the specimen and inference results could be combined on the same position of the slide. Further details on how this operation could be performed are described in the pending PCT application entitled "Method and System for Assisting Pathologist Identification of Tumor Cells in Magnified Tissue Images", serial no. PCT/US17/019051, filed Feb. 23, 2017, the content of which is incorporated by reference herein. Another option is that the compute unit could know the current magnification from the microscope by means of simple electronic communication from the microscope to the compute unit. The microscope monitors which lens is placed by the user into the optical path and communicates the selection to the compute unit.

Deep convolutional neural network pattern recognizers, of the type used in the compute unit of FIG. 5 shown at 200, are widely known in the art of pattern recognition and machine vision, and therefore a detailed description thereof is omitted for the sake of brevity. The Google Inception-v3 deep convolutional neural network architecture, upon which the present pattern recognizers are based, is described in the scientific literature. See the following references, the content of which is incorporated by reference herein: C. Szegedy et al., *Going Deeper with Convolutions*, arXiv:1409.4842 [cs.CV] (September 2014); C. Szegedy et al., Rethinking the Inception Architecture for Computer Vision, arXiv: 1512.00567 [cs.CV] (December 2015); see also US patent application of C. Szegedy et al., "*Processing Images Using Deep Neural Networks*", Ser. No. 14/839,452 filed Aug. 28, 2015. A fourth generation, known as Inception-v4 is considered an alternative architecture for the pattern recognizers 306. See C. Szegedy et al., Inception-v4, *Inception-ResNet and the Impact of Residual Connections on Learning*, arXiv: 1602.0761 [cs.CV] (February 2016). See also U.S. patent application of C. Vanhoucke, "Image Classification Neural Networks", Ser. No. 15/395,530 filed Dec. 30, 2016. The description of the convolutional neural networks in these papers and patent applications is incorporated by reference herein.

Additional literature describing deep neural network pattern recognizers include the following G. Litjens, et al., *Deep learning as a tool for increasing accuracy and efficiency of histopathological diagnosis*, www.nature.com/scientificreports 6:26286 (May 2016); D. Wang et al., Deep Learning for Identifying Metastatic Breast Cancer, arXiv: 1606.05718v1 (June 2016); A. Madabhushi et al., *Image analysis and machine learning in digital pathology: Challenges and opportunities*, Medical Image Analysis 33 p 170-175 (2016); A. Schuamberg, et al., *H&E-stained Whole Slide Deep Learning Predicts SPOP Mutation State in Prostate Cancer*, bioRxiv preprint http://bioRxiv.or/content/eary/2016/07/17/064279.

Sources for training slides for training the deep neural network pattern recognizer 200 can be generated from scratch by whole slide scanning of a set of slides of the type of samples of interest. For example, slide images for training can be obtained from Naval Medical Center in San Diego, Calif. (NMCSD) and publicly available sources such as from the CAMELYON16 challenge and The Cancer Genome Atlas (TCGA). Alternatively, they could be generated from a set of images of different slides captured by the camera of FIG. 1.

Digital whole slide scanners and systems for staining slides are known in the art. Such devices and related systems are available from Aperio Technologies, Hamamatsu Photonics, Philips, Ventana Medical Systems, Inc., and others. The digital whole slide image can be obtained at a first magnification level (e.g. 40×), which is customary. The image can be upsampled or downsampled to obtain training images at other magnifications. Alternatively, the training slides can be scanned multiple times at different magnifications, for example at each magnification level offered by conventional manually-operated microscopes.

Inference Speed

In some implementations it may be possible to perform inference on a digital image that is the entire field of view of the microscope. In other situations, it may be desirable to perform inference on only a portion of the image, such as several 299×299 rectangular patches of pixels located about the center of the field of view, or on some larger portion of the field of view.

Using an Inception v3-based model with 299×299 pixel input size and a 16 MP camera, a dense coverage of a spherical area of the optical FoV (2700 pixels diameter) requires ~120 patch inferences. If inference is run only for the center third (increasing inference granularity, and using the other two third as context), it will require ~1200 inference calls. Additional inference calls might be required if one adds rotations and flips, or ensembling.

Table 2 lists the number of inference calls and inference times using conventional state of the art graphics processing units and inference accelerators.

TABLE 2

| Configuration | # inference calls for FoV | inference time (GPU)* | inference time (accelerator)** |
|---|---|---|---|
| Dense coverage, Inception V3 (baseline) | 120 | 0.8 sec | 2 msec |
| Dense coverage, inference on center third (stride ⅓) | 1200 | 8 sec | 0.02 sec |
| 8 Rotations and flips | 9600 | 64 sec | 0.17 sec |
| Ensembling (5 models) | 48000 | 320 sec | 0.85 sec |

*assuming 150 inferences per second, Inception-v3
**assuming 56000 inferences per second with an inference accelerator system Assuming a camera 124 operates at 30 frames per second (fps) for a seamless substantial near real time experience, a dense coverage with a reasonable combination of rotation, flips, and ensembling is possible.

Inference Accelerator (214, FIG. 5)

Inference accelerators, also known as artificial intelligence (AI) accelerators, are an emerging class of microprocessors or coprocessors which are designed to speed up the process of performing inference of input data sets for pattern recognition. These systems currently take the form of a combination of custom application-specific integrated circuit chips (ASICs), field programmable gate arrays (FPGAs), graphics processing units (GPUs) and general purpose computing units. In some applications of the system of FIG. 1 it may be desirable to include an inference accelerator in the compute unit 126, as shown in FIG. 5. Inference accelerators are described in the art, see Jonathon Ross, et al., U.S. patent application publication 2016/0342891 entitled "Neural Network Processor", and currently available on the market such as the NVidia™ and Tesla™ P40 and P4 GPU Accelerators and the Intel™ Deep Learning Inference Accelerator.

In a simple implementation, the system of FIG. 1 could just use a USB camera output plugged into a standard PC (compute unit 126) which performs the pattern recognition and outputs the overlay graphic (enhancement) via a graphic card output interface (e.g., HDMI) to the AR display device. The inference can be done by a graphics processing unit (GPU) in the standard PC. In this configuration, an on-device inference accelerator would be optional and not necessary. In the event that the need arises for faster inference, the computer could be augmented later on with an off-the shelf inference accelerator as a plug-in module.

Generation of Enhancement

The generation of the enhancement to project onto the field of view can be performed as follows:

1) the machine learning pattern recognizer 200 in the compute unit 126 runs model inference on the field of view, to create tumor probability per region (using cancer detection as an example here).

2a) heatmap: the tumor probability for each image patch in the field of view is translated into a color value (e.g. RGB), and those color values are stitched together to create a heatmap. This task can be performed by the graphics card 206.

2b) polygon outline: the tumor probabilities are thresholded at a certain score (e.g. probability >50%), and the boundary of the remaining region (or regions, if there are several not connected regions) form the polygon outline. Again this task can be performed by the graphics card 206.

3) the digital image data from step 2A or 2B is translated into an image on a display by the AR display unit 128, that is then projected into the optical path by lens 130 and semi-transparent mirror 120.

Additionally, the graphics card 206, either alone or with outputs from the machine learning pattern recognizer can generate Gleason score grading, annotations etc. for including in the digital enhancement data and provide such additional enhancements to the AR display module 128.

Communication of the microscope with a computer about the location on the slide.

In practice, in some situations it may be useful to perform a whole slide scan of the specimen slide in addition to pathologist use of the microscope system of FIG. 1. In this situation, the whole slide scan may be resident on the workstation 140 (or shared by both the workstation 140 and the compute unit 126). A number of possible uses may be made of the enhancement to the field of view, including:

1. highlighting of the microscope current field of view (FoV) on the whole slide image (e.g. for teaching purposes). Localization of the FoV could be done either via image registration of the microscope image onto the whole slide image, or by use of the motor 116 driving the microscope stage 110 with the motor coordinates mapped onto the whole slide image coordinates.

2. automatic navigation of the microscope FoV to a designated area on the slide. For example, the microscope could operate in a "pre-scan" mode in which the motor 116 drives the microscope slide to a series of X-Y positions and obtains low magnification images with the camera at each position. The images are passed to the machine learning pattern recognizer in the compute unit 126 and the pattern recognizer identifies those images from respective positions that contain areas of interest (e.g., cells likely to be cancerous). Then, during use by the pathologist, the motor 116 could be operated to drive the slide to those positions and the operator prompted to investigate the field of view at each position and the field of view augmented with suitable enhancements (heat maps, outlines, etc.). In this embodiment, the compute unit may operate in conjunction with a user interface for the microscope to aid the pathologist work flow. Such user interface could be incorporated in the microscope per se or be presented in the display 142 of the workstation 140. For example, in FIG. 1 the workstation 140 includes a display 142 which displays the current field of view 150 of the microscope. By using the mouse 146 or keyboard 144 the pathologist could enter commands on the workstation to cause the microscope stage motor 116 to step through a sequence of positions on the slide containing areas of interest. The identification of areas of potential interest at low magnification could be performed on the whole slide image, and the positions of areas of potential interest translated to slide coordinates using a mapping of motor coordinates to slide coordinates.

3. transfer of labels and annotations from the whole slide image to the microscope image A whole slide image of the specimen slide obtained by a whole slide scanner can be provided with labels or annotations for various objects of interest in the image. Because it is possible to obtain registry between the whole slide image and the slide on the motorized stage 110 (e.g., from a mapping of motor 116 positions to whole slide image coordinates), it may be possible transfer the labels and annotations to the microscope image seen through the eyepiece. This is possible by providing the labels and annotations to the graphics card 206 in the compute unit, and then providing the digital data of such labels and annotations to the AR display unit 128 when the motor drives the slide to the coordinates where such labels and annotations exist.

The method of obtaining registration between the whole slide image and the slide on the microscope could be implemented as an algorithmic solution, or by using computer vision approaches, such as image registration, to locate the region of the whole slide image that corresponds to the camera image.

4. Output of the field of view along with the prediction to a local storage, for usage in e.g. a pathology report In practice, it may be desirable for the pathologist to make records of their work in characterizing or classifying the sample. Such records could take the form of digital images of the field of view (with or without enhancements) which can be generated and stored (e.g., in the memory 212 of the compute unit) and then transmitting them via interface 216 to the attached pathology workstation 140. The workstation software will typically include workflow software that the pathologist follows in performing a classification or characterization task on a sample and generating a report. Such software includes a tool, e.g., icon or prompts, which permit the pathologist to insert into the report the stored digital images of the field of view and relevant annotations or enhancements which are stored in the memory 212.

Further optional features may be included in the system.

A. Output Port for Displaying Field of View on a Monitor

The compute unit includes an interface or port 216 for connecting the compute unit to the attached peripheral pathologist workstation 140. This interface allows the field of view captured by the camera and any enhancement generated by the graphics card to be transmitted to the monitor 142 of the workstation 140.

B. On Demand a Connected Monitor Displays Image Regions that are Similar to the One in the Current Field of View, with Annotations Etc.

In one possible configuration, the monitor 142 of the workstation 140 displays image regions from other slides (e.g., from other patients) that are "similar" to the one in the current field of view, along with any enhancements or annotations which may exist for the other slide(s). In particular, the workstation 140 may include a memory loaded with digital image data of a set of other slides from other patients, and potentially hundreds or thousands of such slides. The workstation may include a pattern recognizer which performs pattern recognition of the field of view of the slide on the microscope on all of such other digital slide images and selects the ones that are closest to the field of view. Fields of view (i.e., portions of the selected digital slides stored in memory) can be presented on the display 142 of the workstation 140 alongside the current field of view through the microscope 100. Each of the slides stored in memory on the workstation is associated with metadata such as the patient diagnosis, date, treatment, outcome or survival data after treatment, age, smoker status, etc. The display of the fields of view of the selected digital slides can be augmented with the display of the metadata.

Examples of Enhancements

1. Heat Map

FIG. 2B shows an example of a "heatmap" in the form of an overlay of colored pixels which identify areas of particular interest, e.g., likely to contain cancer cells. Heatmaps assist the pathologist in reviewing a slide by presenting to the pathologist an overlay on the field of view in which discrete areas (i.e., groups of pixels) of the slide which have a high probability of containing tumor cells are indicated in a particular color, e.g., dark red. Conversely, areas in the field of view with relatively low probability of containing tumor cells could be left alone or rendered in a contrasting color, e.g., blue or violet. The heatmap image can be accompanied by a list of different regions, where there are groups of cells with a high probability of containing tumor cells.

In one embodiment, the scores for small groups of pixels ("patches") in the digital slide image captured by the camera 124 range from 0.0 to 1.0. The areas of the heatmap 20 with the highest scores are shown as dark red, whereas the areas with the areas with the lowest scores are either left alone (not enhanced) or shown in another contrasting color, such as violet. The code 22 of FIG. 7 essentially uses the visible spectrum (i.e., colors of the rainbow) to assign colors to tumor probability scores. However, it would be possible to use only a portion of the visible spectrum, for example only generate an enhancement of pixels which have tumor probability likelihood of greater than 0.5. Moreover, in yet another possible alternative embodiment only degrees of grayscale could be used for the code, e.g., with white corresponding to a score of 0, black corresponding to score of 1, and degrees of gray making up the values between 0 and 1. For example, single color (e.g., green) could be used and opacity (grayscale) can be used to encode tumor probability.

Further details on the generation and calculation of heatmaps and tumor probability scores are described in the pending PCT application "Method and System for Assisting Pathologist Identification of Tumor Cells in Magnified Tissue Images", serial no. PCT/US17/019051 filed Feb. 23, 2017, which is incorporated by reference.

2. Outlines of Regions of Interest and Annotations

FIG. 3B shows an example of the outline of a region of interest, which can be generated and projected on the field of view as described above. The outlines can be accompanied by textual matter (annotations) such as Gleason score, measurements of size, e.g., tumor diameter, cancer likelihood prediction, cell counts or other relevant pathology information. The display of size measurement data, e.g., "tumor diameter 2 mm", is possible because the compute unit knows the current objective lens power and hence can translate pixels of image data into physical units. Such measurements can trigger additional labels or annotations, such as "micrometastasis" vs "macrometastasis". The annotations could also include statistics, such as the % of the image positive for cancer cells and the % of the image negative for cancer cells, and confidence or probability scores.

3. Rectangles Identifying Objects

FIG. 4B shows an example of the use of rectangles or bounding boxes placed around objects of interest. This approach may be used for example in the identification of bacteria (e.g., tuberculosis), protozoa (e.g., plasmodium), eggs from parasites, or other pathogens in food, blood, water or other types of biological samples. The rectangles could be accompanied by additional information such as annotation like size, confidence or probability scores, species identification, etc., depending on the application.

Workflow

Figure 6:
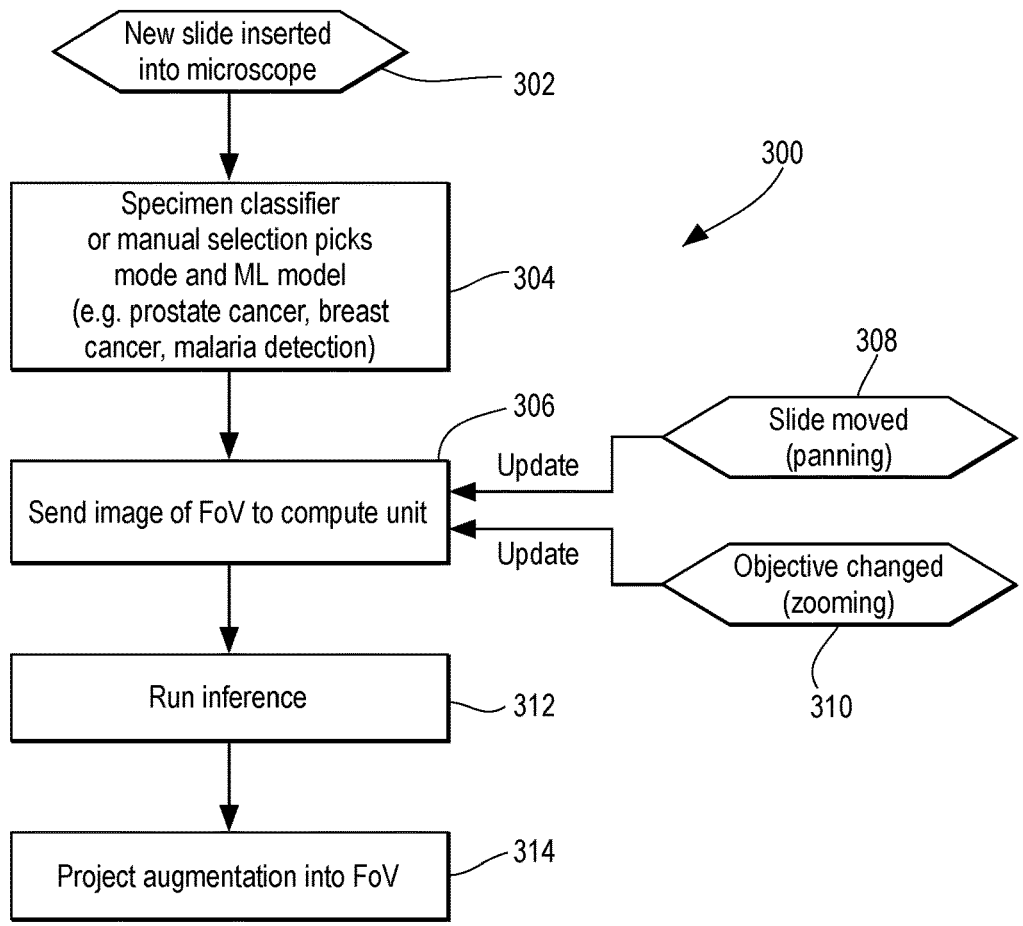
FIG. 6 is a flow chart showing the work flow of the system of FIG. 1.

FIG. 6 is a flow chart showing the workflow using the system of FIG. 1. At step 302, the user inserts a new slide 114 onto the microscope stage 110. At step 302, a specimen classifier or manual selection (e.g., by use of the attached workstation 140 or by user interface controls on the microscope or on the compute unit) selects the pattern recognition mode (e.g., breast cancer, prostate cancer, malaria) according to the type of specimen on the slide and the relevant machine learning pattern recognizer in the compute unit is flagged for operation.

At step 306 an image of the field of view is captured by the digital camera 124 and send to the compute unit 126. If the operator moves the slide (e.g., by operation of the stage motor 116 in a panning mode) a new image of the field of view is captured by the camera. Similarly, if the operator changes the objective lens 108 (e.g., to zoom in or out) a new image is captured. The new images are sent to the compute unit 126. (In practice, the camera 124 could be operated at a continuous frame rate of say 10 or 30 frames per second and the updating of the field of view in the compute unit could be essentially continuous and not merely when either stage position or objective lens are changed.)

At step 312 the image of the field of view is provided as input to the relevant machine learning pattern recognizer 200 in the compute unit 126 (FIG. 5) to perform inference. As a practical matter, step 312 may be performed repeatedly, in synchrony with the frame rate of the camera 124.

At step 314 the graphics card or GPU 206 in the compute unit 126 generates digital image data corresponding to the enhancement or augmentation relevant to the sample type and this digital image data is provided to the AR display unit 128 for projection onto the field of view for viewing by the pathologist in the eyepiece 104.

The compute unit may include controls (e.g., via the attached workstation) by which the user can specify the type of annotations or enhancements they wish to see projected onto the field of view, thereby giving the user control as to how they wish the microscope to operate in augmented reality mode. For example, the user could specify enhancements in the form of heat map only. As another example, if the specimen is a blood sample, the user could specify enhancements in the form of rectangles identifying plasmodium present in the sample. In a prostate sample, the user can specify boundaries our outlines surrounding cells which a Gleason score of 3 or more, as well as annotations such as shown and described previously in FIG. 3B. As another example, the user may be provided with a switch (such as a foot switch) to turn on and off the projection and thus display of the enhancements in the microscope field of field of view.

Ensemble of Machine Learning Pattern Recognizers

It will be noted that the system of FIG. 1 is designed to be used in conjunction with a microscope offering several different objective lenses and magnification levels. Typically, a particular pattern recognizer or machine learning model is trained on a set of training slides at a particular magnification level. Accordingly, to accommodate the possibility of the user changing objective lenses during inspection of a given sample, a preferred embodiment of the compute unit includes an ensemble of pattern recognizers, each trained on image data at different magnification levels. For example, in FIG. 8, there is shown an ensemble of four different pattern recognizers (406A, 406B, 406C and 406D). Each of the pattern recognizers takes the form of a deep convolutional neural network trained on a set of digital slide images at a particular magnification. For example, pattern recognizer 406A is trained on 40× magnification slide images. Pattern recognizer 406B is trained on 20× magnification slide images. Pattern recognizer 406C is trained on 10× magnification slide images. Pattern recognizer 406D is trained on 5× magnification slide images. Ideally, each of the magnification levels the pattern recognizers are trained at correspond to the magnification levels which are available on the microscope of FIG. 1. This is not essential, because if there is a mismatch between microscope magnification and training slide magnification the microscope image captured by the camera 124 could be upsampled or downsampled to correspond to the magnification level of the pattern recognizer.

In operation, a patch (i.e., a portion of the microscope FoV, such as a 299×299 rectangular patch of pixels) 402A, 402B, 402C or 402D is provided as an input 404A, 404B, 404C or 404D to the relevant pattern recognizer 406A, 406B, 406C, 406D depending on the current objective lens being used on the microscope. In a heat map application, the score for a patch of pixels between 0 and 1 is generated as the last layer of the neural network pattern recognizers 406A, 406B. 406C, 406D, in the form of a multinomial logistic regression, which generates a prediction, in the form of a probability of between 0 and 1, of which of the classes (here, healthy vs tumor) the input data (patch) belongs to. Multinomial logistical regression is known in the art of supervised learning and optimization, and is sometimes referred to as "Softmax Regression." A tutorial found on the web, http/ufldl.stanford.edultutonalsupervised/SoftmaxRegression/provides further details, which is incorporated by reference herein. The output 408A, 408B, 408C, 408D is thus the score for the patch of pixels.

In one configuration, the process of generating a score for a patch of pixels is performed for all of the patches forming the field of view of the microscope. The outputs 408A, 408B, 408C 408D are provided to the graphics card (GPU) 206 in the compute unit to generate data representing the augmentation, in this example the heat map. In the situation where the stage remains stationary but the user changes magnification, then two of the members of the ensemble shown in FIG. 8 can be used to generate heat maps, one for the first magnification and one for the second magnification. In theory it is possible to combine the outputs of the members of the ensemble. Thus, in one variation, where multiple members of the ensemble are used, for example where there was a change in the focus plane, multiple outputs 408A, 408B. 408C or 408D are supplied to a combiner function 250 which combines the outputs and sends the data to the graphics card. Further details are described in the previously cited PCT patent application filed Feb. 23, 2017.

Figure 8:
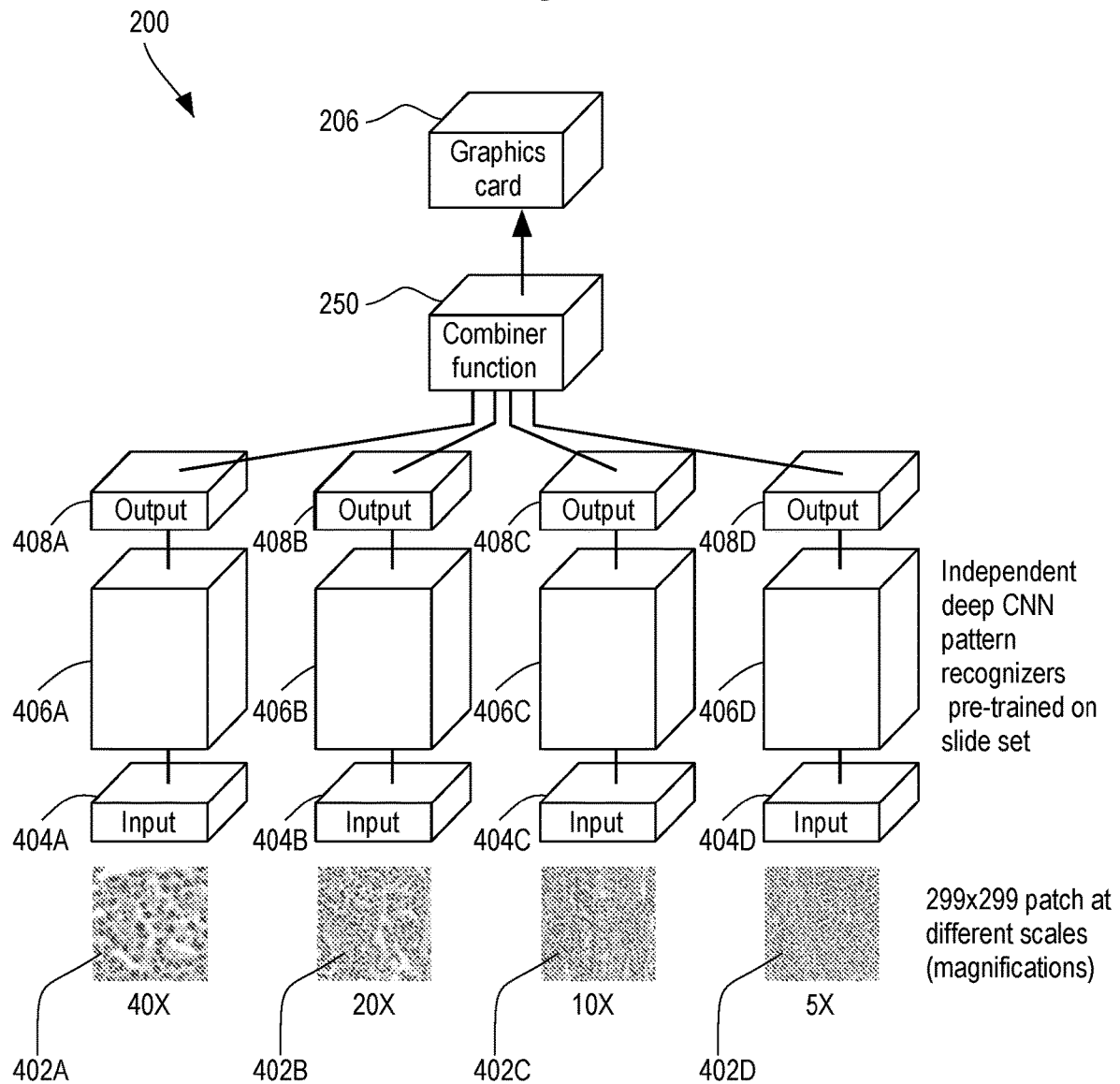
FIG. 8 is an illustration of a machine learning pattern recognizer in the form of an ensemble of independent deep convolutional neural networks which are pre-trained on a set of microscope slide images. Each member of the ensemble is trained at a particular magnification level.

It will also be appreciated that the compute unit preferably includes an ensemble of pattern recognizers trained on a set of microscope slide images at different magnification levels for each of the pathology applications the microscope is used for (e.g., breast cancer tissue, lymph node tissue, prostate tissue, malaria, etc.), as indicated in FIG. 8.

Portable Media with Machine Learning Pattern Recognizers

Figure 9:
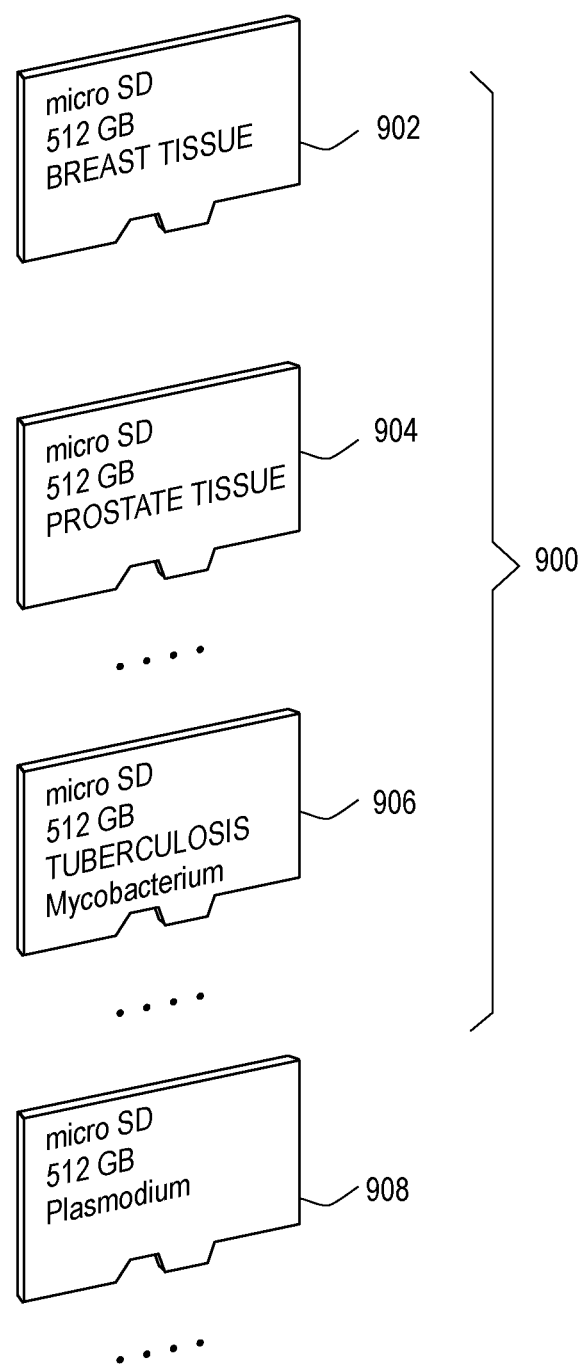
FIG. 9 is an illustration of a set of portable computer storage media, each of which is loaded with code, parameters, and associated data representing an ensemble of independent deep convolutional neural networks trained on a set of microscope slide images for a particular application, such as detection of breast cancer in breast tissue, detection and characterization of cancer cells in prostate tissue, etc. A user of the system of FIG. 1 who wants to augment the capability of the microscope system can obtain one or more of the media of FIG. 9 and load the associated ensemble of deep convolutional neutral networks into the local compute unit of FIGS. 1 and 5. Alternatively, additional ensembles of deep convolutional neural networks could be downloaded from a remote data store over a network interface in the compute unit.

In one embodiment, the compute unit 126 of FIGS. 1 and 5 includes a hardware configuration to receive and store locally new trained pattern recognizers/machine learning models, for different types of biological samples or applications of the microscope. This configuration is shown for example in FIG. 5 as a SD card interface 210 which allows individual SD cards containing machine learning models to be inserted into the compute unit and the content downloaded and stored in the memory 202. FIG. 9 shows an example of a set 900 of SD cards, including cards 902, 904, 906 and 908. Each card contains the model parameters, filter coefficients, executable code and other details of a machine learning pattern recognizer for a particular pathology application, such as identification of cancer cells in breast tissue (card 902), identification of cancer cells in prostate tissue (904), identification of tuberculosis mycobacterium in a blood sample (card 906), identification of plasmodium protozoa in blood samples for malaria detection (card 908). In this design, the compute unit could be provided for example as standard equipment with a machine learning model for a common pathology application, such as for example cancer cell detection in a pap smear, and the user could obtain from a provider or source an additional card or set of cards 900 to enhance the capabilities of the microscope for other pathology applications. In this manner the laboratory operating the microscope can tailor their needs for augmented reality in a microscope to particular pathology applications as needed or as the market dictates. The laboratory need not create the models, rather a service provider could create them separately from a set of training slide images, validate the models to insure robustness and generalizability, and then create portable storage media such as SD cards containing such models and provide them to customers on an as-needed basis.

While SD cards are illustrated in FIG. 9, other physical formats of memory devices capable of storing machine learning pattern recognition models could of course be used, including those available currently and those generated in the future. It is also possible for the compute unit to connect to a computer network and download additional machine learning models (or ensembles of models) over a computer interface such as the interface 216 (FIG. 5).

Specific Applications

While several specific applications of the microscope for pathology review have been described, including breast cancer detection, prostate cancer detection, identification of pathogens (e.g., plasmodium, tuberculosis, malaria parasites, eggs of parasites) etc., it will be appreciated that other applications in the field of pathology are of course possible. Additionally, the principles of the system of FIG. 1 could be extended to other applications of microscopy, such as quality control inspection of small parts, food safety or inspection, water quality monitoring, and the like.

Stand-Alone System

The microscope system of FIG. 1 with local compute unit and pattern recognition model(s) is ideally suited as a local, stand-alone system. As long as it has available a suitable power supply for the electronics shown in FIGS. 1 and 5, it can be considered portable and used in remote locations. In its most basic form, it does not require any internet or other network connection, and the attached peripheral workstation 140 is not absolutely necessary. The compute unit could come with its own attached user interface (not shown) or controls to turn augmentation on or off, select models, change to the appropriate machine learning model for the particular magnification chosen, and any other ancillary tasks. The design of the user interface could take any suitable form, such as simple touch screen and icons to guide the user to provide appropriate selections.

Networked Configuration

In another configuration, the system of FIG. 1 could be implemented in a networked environment where the compute unit is connected to remote servers, e.g. to obtain new machine learning models or to perform the inference, or inference acceleration, on a separate platform. For example, some of the processing tasks described previously in conjunction with the display of the remote workstation 140 could be performed either locally on the workstation or on a networked computer remote from both the compute unit and the workstation.

Motor-Driven Stage 110/116

The incorporation of a motor driven stage 110 (which is common in pathology microscopes) allows for additional functions to be formed to further assist the pathologist. For example, the motor 116 could drive the slide to a sequence of positions to capture low magnification images with the camera of the entire slide. The low magnification images are then supplied to a machine learning pattern recognizer in the compute unit trained at low magnification levels to provide preliminary detection of suspicious regions (e.g., regions likely containing cancer cells or likely to contain tuberculosis mycobacteria. Then, the microscope stage could be driven automatically in a series of steps to those fields containing potentially relevant areas. The incremental positioning of the slide could be executed upon command of the user, e.g., via controls for the microscope or via the user interface of the attached workstation.

An exhaustive search of the whole slide at 40× for areas of interest in a short amount of time is not currently feasible with current technology. However, the use of a low magnification model able to detect suspicious regions at low magnification and then only zoom in on demand is currently feasible using the system of FIG. 1.

Model Training

Images obtained from the camera 124 may, in some implementations, be different in terms of optical quality or resolution than images from whole slide scanners on which the machine learning pattern recognizers are trained. The quality of the digital camera 124 and associated optical components has a lot to do with this, and ideally the quality of the digital camera and associated optics is the same as, or nearly the same as, the quality of the optical components and camera used for capturing the training slide images. While the image resolution should be comparable, the images from the microscope camera 124 are likely to have some artifacts such as geometric distortion that are absent or less frequently present in the whole slide scanner training images. Collecting microscope-specific training images for training new models is in theory possible. However it is not a particularly scalable solution. A more practical solution is make sure the whole slide image-based patter recognition models generalize to the microscope images captured by the camera 124. If generalization with the default models is not acceptable, it should be possible to generate artificial training data from whole slide image scans that "look like" their corresponding microscope camera images. Such artificial training data can be generated by introducing parametric deformations to the whole slide image scan images and using the deformed images for training. Examples of such parametric deformations include warping, adding noise, lowering resolution, blurring, and contrast adjustment.

An alternative is to use the camera of a microscope to generate a large number of training images from a multitude of slides, and then use such images to train the models instead of images obtained from a whole slide scanner.

Another alternative training a generative adversarial network (GAN) to produce the images for training the machine learning pattern recognizers.

Further Considerations

The image quality of the camera 124 of FIG. 1 is an important consideration. Since a camera live stream will often be the image source, an investigation should be performed on how the image quality of the images in the live stream compares to the still images (typically high quality) obtained from a whole slide scanner and used for training, and how that affects model performance.

One particular challenge is that the optical resolution of the human eye is much higher than that of current digital cameras. For instance, in order to detect a tiny metastasis, a machine learning model might require zooming in further (switching to higher power objectives) than a human might need to for the same metastasis. One way of addressing this is prompting the user to switch to high (or higher) magnification levels when they are viewing areas of potential interest and then generating new enhancements at the higher power. Another approach is to use an ultra-high resolution camera such as the Cannon 250 megapixel CMOS sensor.

As noted above, the optical component 120 including the semi-transparent mirror 122 should be placed in the optical path so that it renders the best visual experience. In one possible configuration the microscope may take the form of a stereoscopic microscope with two eyepieces and it may be possible to project the enhancement into the field of view of one or both of the eyepieces.

Another consideration is making sure the eye sees the enhancement or overlay on the field of view with the same registration as the camera. This could be performed using fiduciary markers which are present in the field of view and the image captured by the camera.

It is also noted that labels which may be present on whole slide images of the slide under examination can be transferred to the camera images and projected into the field of view, e.g., using image registration techniques, as described previously. Changes to the optics by the user (e.g. focusing, diopter correction) will affect the image quality on the camera image and the displayed image. The camera images need to remain sharp and high quality so that inference can be performed In one possible configuration, the compute unit includes an image quality detector module that assesses when the image is good enough to perform inference. If the image is not of sufficient quality the user could be prompted to make appropriate correction, such as adjust the focus or make other optical adjustments to the microscope.

It was also noted previously that the augmented reality microscope of this disclosure is suitable for other uses, such as inspection or quality control, e.g., in manufacturing of electronic components or other products where the inspection occurs via a microscope. Thus, as an additional aspect of this disclosure, a method for assisting a user in review of a object (e.g., manufactured object) with a microscope having an eyepiece has been disclosed, including the steps of (a) capturing, with a camera, a digital image of the object as seen by a user through the eyepiece of the microscope, (b) using a machine learning pattern recognizer to identify areas of interest (e.g., defects) in the object from the image captured by the camera, and (c) superimposing an enhancement to the view of the object as seen by the user through the eyepiece of the microscope as an overlay. As the user moves the sample relative to the microscope optics and then stops or changes magnification or focus of the microscope, a new digital image is captured by the camera and supplied to the machine learning pattern recognizer, and a new enhancement is superimposed onto the new view of the object as seen through the eyepiece in substantial real time, whereby the enhancement assists the user in classifying or characterizing the object. The features of the appended claims are deemed to be applicable to this variation wherein instead of a biological sample on a slide an object (e.g., manufactured object, computer chip, small part, etc.) is viewed by the microscope and the camera captures images of the object as seen in the microscope field of view.

An aspect may also provide a system assisting a user in review of a slide containing a biological sample, comprising, in combination: a microscope having a stage for holding a slide containing a biological sample, at least one objective lens, and an eyepiece, a digital camera capturing magnified digital images of the sample as seen through the eyepiece of the microscope, a compute unit comprising a machine learning pattern recognizer which receives the digital images from the digital camera, wherein the pattern recognizer is trained to identify regions of interest in biological samples of the type currently placed on the stage, and wherein the pattern recognizer recognizes regions of interest on the digital image captured by the camera and wherein the compute unit generates data representing an enhancement to the field of view of the sample as seen by the user through the eyepiece; and one or more optical components coupled to the eyepiece for superimposing the enhancement on the field of view; wherein the camera, compute unit and one or more optical components operate such that as the user moves the sample relative to the microscope optics and then stops or changes magnification or focus of the microscope, a new digital image is captured by the camera and supplied to the machine learning pattern recognizer, and a new enhancement is superimposed onto the new field of view of the sample as seen through the eyepiece in substantial real time.

While presently preferred embodiments are described with particularity, all questions concerning scope of the invention are to be answered by reference to the appended claims interpreted in light of the foregoing.

I claim:

1. A method for assisting a user in review of a slide containing a biological sample with a microscope having an eyepiece comprising the steps of:
   (a) capturing, with a camera, a digital image of the sample as seen through the eyepiece of the microscope;
   (b) using a machine learning pattern recognizer to identify areas of interest in the sample from the image captured by the camera; and
   (c) superimposing an enhancement to the view of the sample as seen through the eyepiece of the microscope as an overlay, wherein the enhancement is based upon the identified areas of interest in the sample,
   (d) wherein, when the sample is moved relative to the microscope optics or when a magnification or focus of the microscope changes, a new digital image of a new view of the sample is captured by the camera and supplied to the machine learning pattern recognizer, and a new enhancement is superimposed onto the new view of the sample as seen through the eyepiece in substantial real time, whereby the enhancement assists the user in classifying or characterizing the biological sample.

2. The method of claim 1, wherein step (b) further comprises the step of using an inference accelerator to facilitate substantial real-time generation of the enhancements.

3. The method of claim 1, further comprising the step of providing an interface in a compute unit coupled to the microscope to receive and store locally in the compute unit a new trained pattern recognizers/machine learning models, for different types of biological.

4. The method of claim 1, wherein the biological sample of a type selected from group of samples consisting of tissue, a lymph node, blood, sputum, urine, stool, water, soil, and food.

5. The method of claim 1, wherein the areas of interest comprise cancerous cells or tissue, cellular structures, types of cells, or a pathogen, wherein the pathogen is optionally a pathogen selected from the group consisting of plasmodium, tuberculosis bacterium, malaria protozoa, virus, and egg of parasites.

6. The method of claim 1 wherein the enhancement is selected from the group of enhancements consisting of a heatmap, a region of interest boundary, an annotation, a Gleason score, a classification likelihood prediction, a cell count, and a physical measurement, wherein the physical measurement is optionally a tumor diameter.

7. The method of claim 1, further comprising the step of displaying on a monitor of a workstation associated with the microscope one or more image regions from one or more other samples that are similar to the one in the current field of view of the microscope.

8. The method of claim 7, further comprising the step of displaying metadata associated with the displayed one or more other samples.

9. The method of claim 1, further comprising the step of outputting image data of the view of the sample as seen through the eyepiece of the microscope and the enhancement to an external display.

10. The method of claim 1, wherein the microscope further comprises a motorized stage for supporting and moving the slide relative to the eyepiece, and wherein the method further comprises the step of using the motorized stage and digital camera, and machine learning pattern recognizer to perform a preliminary detection of areas of potential interest in the biological sample.

11. The method of claim 10, further comprising the step of controlling the motorized stage to move the stage to place the areas of potential interest for viewing by the user and generating an enhancement at each of the areas of potential interest.

12. The method of claim 1, further comprising the step of integrating the view of the sample of the microscope with the superimposed enhancement with a separate digital image of the sample obtained from a whole slide scanning of the slide containing the biological sample to generate an integrated view of the sample.

13. The method of claim 12, further comprising the step of highlighting the view of the sample on the integrated view of the sample.

14. The method of claim 12, wherein the microscope further comprises a motorized stage for supporting and moving the slide relative to the eyepiece, and wherein the method further comprises the step of designating an area on the separate digital image and moving the motorized stage such that the designated area is in the field of view of the microscope.

15. The method of claim 14, further comprising projecting information associated with the designated area on the separate digital image as an enhancement to view of the sample, wherein the projected information optionally comprises labels and/or annotations.

16. The method of claim 1, further comprising the step of downloading from a remote data source over a network additional ensembles of machine learning pattern recognizers.

17. The method of claim 1, further comprising:
receiving data indicating a magnification of the microscope; and
selecting a machine learning pattern recognizer of a plurality of machine learning pattern recognizers based upon the received data,
wherein the selected machine learning pattern recognizer is used to identify areas of interest in the sample from the image captured by the camera.

18. A system assisting a user in review of a slide containing a biological sample, comprising:
a microscope having a stage for holding a slide containing a biological sample, at least one objective lens, and an eyepiece;
a digital camera configured to capture digital images of a view of the sample as seen through the eyepiece of the microscope;
a compute unit comprising a machine learning pattern recognizer configured to receive the digital images from the digital camera, wherein the pattern recognizer is trained to identify regions of interest in biological samples of the type currently placed on the stage, wherein the pattern recognizer recognizes regions of interest on a digital image captured by the camera, wherein the compute unit generates data representing an enhancement to the view of the sample as seen through the eyepiece of the microscope, and wherein the enhancement is based upon the regions of interest in the sample; and
one or more optical components coupled to the eyepiece for superimposing the enhancement on the field of view,
wherein the camera, compute unit and one or more optical components are configured such that when the sample is moved relative to the microscope optics or when a magnification or focus of the microscope changes, a new digital image of a new field of view of the sample is captured by the camera and supplied to the machine learning pattern recognizer, and a new enhancement is superimposed onto the new field of view of the sample as seen through the eyepiece in substantial real time.

19. The system of claim 18, wherein the enhancement is selected from the group of enhancements consisting of a heatmap, a region of interest boundary, an annotation, a Gleason score, a classification likelihood prediction, a cell count, and a physical measurement, wherein the physical measurement is optionally a tumor diameter.

20. The system of claim 18, wherein the regions of interest comprise cancerous cells or tissue, cellular structures, types of cells, or a pathogen, wherein the pathogen is optionally selected from the group consisting of plasmodium, tuberculosis bacterium, malaria protozoa, virus, and egg of parasites.

21. The system of claim 18, wherein the camera is operated substantially continuously capturing digital images at a frame rate.

22. The system of claim 18, further comprising an inference accelerator operating on the digital images facilitating substantial real-time generation of the enhancements.

23. The system of claim 18, further comprising an interface in the compute unit to a portable computer storage medium containing new machine learning pattern recognizers for different types of biological samples.

24. The system of claim 18, wherein the biological sample is of a type selected from the group of samples consisting of tissue, a lymph node, blood, sputum, urine, stool, water, soil and food.

25. The system of claim 18, further comprising an external workstation associated with the microscope having a display displaying one or more image regions from one or more other samples that are similar to the sample in the current view of the microscope.

26. The system of claim 25, wherein the display displays metadata associated with the displayed one or more other samples.

27. The system of claim 18, wherein the system further comprises a display, and wherein the compute unit outputs image data of the view of the sample as seen through the microscope and the enhancement on the display.

28. The system claim 18, wherein the microscope stage comprises a motorized stage for supporting and moving the slide relative to the eyepiece, and wherein the microscope, motorized stage, digital camera, and machine learning pattern recognizer operated in a mode to perform a preliminary detection of areas of potential interest in the biological sample.

29. The system of claim 28, wherein the motor is configured to move the stage to place each of the areas of potential interest for viewing by the user and wherein the compute unit and one or more optical components generate an enhancement at each of the areas of potential interest.

30. The system claim 18, further comprising an external workstation having a display coupled to the compute unit and wherein the view of the sample on the microscope with the superimposed enhancement is integrated and displayed on the display with a separate digital image of the sample obtained from a whole slide scanning of the slide containing the biological sample to generate an integrated view of the sample.

31. The system of claim 18, wherein the compute unit is in the form of a general purpose computer having an interface to the digital camera and an interface to the one or more optical components.

32. The system of claim 18, wherein the compute unit further comprises an interface to a computer network.

33. An improvement to a microscope system having a microscope eyepiece, a stage for holding a slide containing a sample, and a digital camera for capturing images of the field of view of the microscope eyepiece, the improvement comprising:
a compute unit coupled to the microscope comprising an ensemble of deep neural network pattern recognizers coupled to the microscope trained on a set of slides of samples at different magnifications, the ensemble receiving the images generated by the camera.

34. The improvement of claim 33, wherein the compute unit further comprises an interface to a portable computer storage medium containing new machine learning pattern recognizers for different types of biological samples or applications of the microscope.

35. Apparatus comprising, in combination:
a collection of portable computer storage media each containing different machine learning pattern recognizers for different types of biological samples to be viewed by a pathologist using a microscope, each of the of the different machine learning pattern recognizers in the form of an ensemble of machine learning pattern recognizers trained at different magnification levels.

36. A method of training a machine learning pattern recognizer, comprising:
 a) obtaining whole slide images of a multitude of slides containing biological samples of a given type;
 b) performing parametric deformations on the whole slide images in order to simulate the optical quality of digital images captured by a camera coupled to the eyepiece of a microscope; and
 c) training the machine learning pattern recognizer using whole slide images as deformed in step b).

37. A method of training a machine learning pattern recognizer, comprising:
 a) with a microscope of the type used by a pathologist having a camera and more than one objective lenses, obtaining a multitude of digital images of a biological sample in the field of view of the microscope at different magnifications provided by the more than one objective lenses of the microscope; and
 b) training an ensemble of machine learning pattern recognizers using the images obtained in step a), each member of the ensemble trained at a particular magnification associated with one of the objective lenses.

38. The method of claim 37, further comprising the step of repeating steps a) and b) for different types of biological samples thereby generating a plurality of different ensembles of machine learning pattern recognizers.

39. The method of claim 38, further comprising the step of storing each the plurality of different ensembles of machine learning pattern recognizers onto portable computer storage media.

* * * * *